United States Patent [19]
Redford et al.

[11] Patent Number: 5,818,037
[45] Date of Patent: Oct. 6, 1998

[54] CONTROLLER USING A FLEXIBLE ELEMENT TO VARY LIGHT TRANSFERRED TO A PHOTOSENSITIVE ELEMENT

[75] Inventors: Peter M. Redford, Los Gatos; Donald S. Stern, San Jose, both of Calif.

[73] Assignee: TV Interactive Data Corporation, San Jose, Calif.

[21] Appl. No.: 630,015

[22] Filed: Apr. 9, 1996

[51] Int. Cl.⁶ .................................. G01D 5/34; H01J 1/56
[52] U.S. Cl. ....................... 250/229; 250/221; 250/222.1; 341/31; 340/619
[58] Field of Search ................................ 250/221, 222.1, 250/229, 227.22; 341/31; 340/619; 345/156–158

[56] References Cited

U.S. PATENT DOCUMENTS

| 2,415,168 | 2/1947 | Gieseke . | |
|---|---|---|---|
| 3,360,653 | 12/1967 | Phares . | |
| 3,371,424 | 3/1968 | Sweet | 33/206 |
| 3,526,775 | 9/1970 | Friedrich et al. | 250/221 |
| 3,569,717 | 3/1971 | Awojobi et al. . | |
| 3,621,268 | 11/1971 | Friedrich et al. | 250/222.1 |

(List continued on next page.)

FOREIGN PATENT DOCUMENTS

| 841864 | 11/1989 | Finland . |
|---|---|---|
| 3303-103-A | 1/1983 | Germany . |
| 3236436 | 3/1984 | Germany . |
| 63-63905 | 3/1988 | Japan . |
| 8500817 | 3/1985 | Netherlands . |
| 154030 | 3/1962 | U.S.S.R. . |
| 800637 | 1/1981 | U.S.S.R. . |
| 1244489 | 7/1986 | U.S.S.R. . |
| 2238382 | 5/1991 | United Kingdom . |
| WO 90/05356 | 5/1990 | WIPO . |
| WO 90/13792 | 11/1990 | WIPO . |

OTHER PUBLICATIONS

Linear Applications Databook, National Semiconductor, Widlar, Robert J., "Monolithic Op Amp—The Universal Linear Component", (Figure 10, Analog multiplier/divider), 1986, p. 11.

Linear Applications Databook, National Semiconductor, Widlar, Robert J., "New Op. Amp Ideas", (Figure 21 Opti–electric Pyrometer with Transmitter), Linear Applications Databook, National Semiconductor, 1986, p. 499.

(List continued on next page.)

*Primary Examiner*—Stephone B. Allen
*Attorney, Agent, or Firm*—Skjerven, Morrill, MacPherson, Franklin. & Friel LLP; Alan H. MacPherson; Omkar K. Suryadevara

[57] ABSTRACT

A controller has a light source, such as a light emitting diode ("LED") and a photosensitive element, such as a photodiode mounted on a substrate, such as a printed circuit board ("PCB"). The controller also includes a flexible element having a first shape (e.g. a substantially flat shape) and located adjacent to the substrate opposite to the light source and the photosensitive element. The flexible element transfers a first portion of light from the light source to the photosensitive element. On application of a force to the flexible element (e.g. by touching the flexible element), the flexible element deforms elastically from the first shape into a second shape. In the second shape, the flexible element transfers a second portion of light to the photosensitive element. On cessation of application of the first force, the flexible element reverts back to the first shape, and so transfers the first portion of light to the photosensitive element. The portion of light transferred by the flexible element in the second shape depends on the deformation of the flexible element, and can be calibrated to measure the amount of such deformation.

43 Claims, 13 Drawing Sheets

Microfiche Appendix Included
(1 Microfiche, 32 Pages)

U.S. PATENT DOCUMENTS

| | | |
|---|---|---|
| 3,863,067 | 1/1975 | Gooley ................. 250/231 R |
| 3,886,361 | 5/1975 | Wester ..................... 250/338 |
| 4,013,342 | 3/1977 | Narodny .................. 250/229 |
| 4,040,743 | 8/1977 | Villaume et al. . |
| 4,049,964 | 9/1977 | Wuchinich et al. ......... 250/221 |
| 4,148,014 | 4/1979 | Burson . |
| 4,154,000 | 5/1979 | Kramer ...................... 33/366 |
| 4,307,516 | 12/1981 | Walker ....................... 33/366 |
| 4,316,155 | 2/1982 | Hanisko ..................... 331/18 |
| 4,430,526 | 2/1984 | Brown et al. ................ 178/18 |
| 4,477,724 | 10/1984 | Harmer ..................... 250/229 |
| 4,480,182 | 10/1984 | Ely et al. .................... 250/229 |
| 4,514,732 | 4/1985 | Hayes, Jr. . |
| 4,533,827 | 8/1985 | Fincher ..................... 250/211 |
| 4,565,999 | 1/1986 | King et al. . |
| 4,594,562 | 6/1986 | Gurke et al. . |
| 4,642,459 | 2/1987 | Caswell et al. ............. 250/227 |
| 4,651,023 | 3/1987 | Parsonage . |
| 4,677,428 | 6/1987 | Bartholow ................. 340/708 |
| 4,682,159 | 7/1987 | Davison ..................... 340/709 |
| 4,685,678 | 8/1987 | Frederiksen ............... 273/148 |
| 4,686,361 | 8/1987 | Bard .......................... 250/221 |
| 4,692,612 | 9/1987 | Havel ........................ 250/229 |
| 4,701,048 | 10/1987 | Tokuda et al. . |
| 4,712,885 | 12/1987 | Dawson et al. ............. 350/443 |
| 4,743,772 | 5/1988 | Häfele et al. .............. 250/222.1 |
| 4,746,879 | 5/1988 | Ma et al. . |
| 4,748,323 | 5/1988 | Holiday ..................... 250/221 |
| 4,755,801 | 7/1988 | Gooley ...................... 340/566 |
| 4,787,051 | 11/1988 | Olson ........................ 364/518 |
| 4,795,900 | 1/1989 | Kokubu ..................... 250/229 |
| 4,839,838 | 6/1989 | La Biche et al. .......... 364/709.11 |
| 4,862,172 | 8/1989 | Ross .......................... 341/157 |
| 4,864,647 | 9/1989 | Harrington ................ 455/603 |
| 4,866,602 | 9/1989 | Hall ........................... 364/200 |
| 4,868,896 | 9/1989 | Pietzsch . |
| 4,883,926 | 11/1989 | Baldwin ..................... 178/18 |
| 4,935,621 | 6/1990 | Pikulski .................... 250/229 |
| 4,939,482 | 7/1990 | Nergaard et al. . |
| 4,994,669 | 2/1991 | Stern ........................ 250/229 |
| 5,013,926 | 5/1991 | Aizawa . |
| 5,045,843 | 9/1991 | Hansen ...................... 340/709 |
| 5,059,958 | 10/1991 | Jacobs et al. .............. 340/706 |
| 5,063,376 | 11/1991 | Chang ....................... 340/706 |
| 5,065,146 | 11/1991 | Garrett ...................... 340/709 |
| 5,068,645 | 11/1991 | Drumm ..................... 340/710 |
| 5,086,197 | 2/1992 | Liou .......................... 178/18 |
| 5,096,650 | 3/1992 | Lowenstein et al. . |
| 5,097,353 | 3/1992 | Fujiwara et al. ........... 359/177 |
| 5,115,236 | 5/1992 | Kohler ................... 340/825.69 |
| 5,117,099 | 5/1992 | Schmidt . |
| 5,142,655 | 8/1992 | Drumm ...................... 379/52 |
| 5,166,819 | 11/1992 | Eichel ....................... 359/189 |
| 5,218,771 | 6/1993 | Redford . |
| 5,223,709 | 6/1993 | Pettypiece, Jr. . |
| 5,266,949 | 11/1993 | Rossi ......................... 341/22 |
| 5,288,078 | 2/1994 | Capper et al. .......... 273/148 B |
| 5,297,061 | 3/1994 | Dementhon et al. .......... 364/559 |
| 5,355,147 | 10/1994 | Lear . |
| 5,363,120 | 11/1994 | Drumm . |
| 5,384,459 | 1/1995 | Patino et al. .............. 250/229 |
| 5,459,489 | 10/1995 | Redford . |
| 5,621,207 | 4/1997 | O'Mara ..................... 250/221 |
| 5,650,608 | 7/1997 | Redford et al. ........... 250/210 |

OTHER PUBLICATIONS

Excerpt from Texas Instruments, Inc. manual entitled TLC555I, TLC55C LinCMOS™ Timers; D2784, Sep. 1983—Revised Oct. 1988, pp. 4–195.

Excerpt form Texas Instruments, Inc. manual entitled TLC556I, TLC556C Dual LinCMOS™ Timers; D2796, Feb. 1984—Revised Oct. 1988, pp. 4–203 and 4–204.

*Analog Integrated Circuits Data Book, vol. 10,* Precision Monolithics, Inc., 1990, pp. 7–50 to 7–56.

Graeme, J., "Divide And Conquer Noise In Photodiode Amplifiers," *Electronic Design Analog Applications Issue,* Jun.27, 1994, pp. 10, 12, 14, 16–18, 22, and 26.

Graeme, J., "Filtering Cuts Noise In Photodiode Amplifiers", *Electronic Deisgn Analog Applications Issue,* Nov. 7, 1994, pp. 9–10, 12, 15–18, and 20–22.

"A High–Precision Differential Photometer", A.N. Salharov and B.V. Novogtudskii, Jan. 1994, pp. 1222–1223.

"Horowitz and Hill: The Art of Electronics", Paul Horowitz, et al., Cambridge University 1980, pp. 164–165.

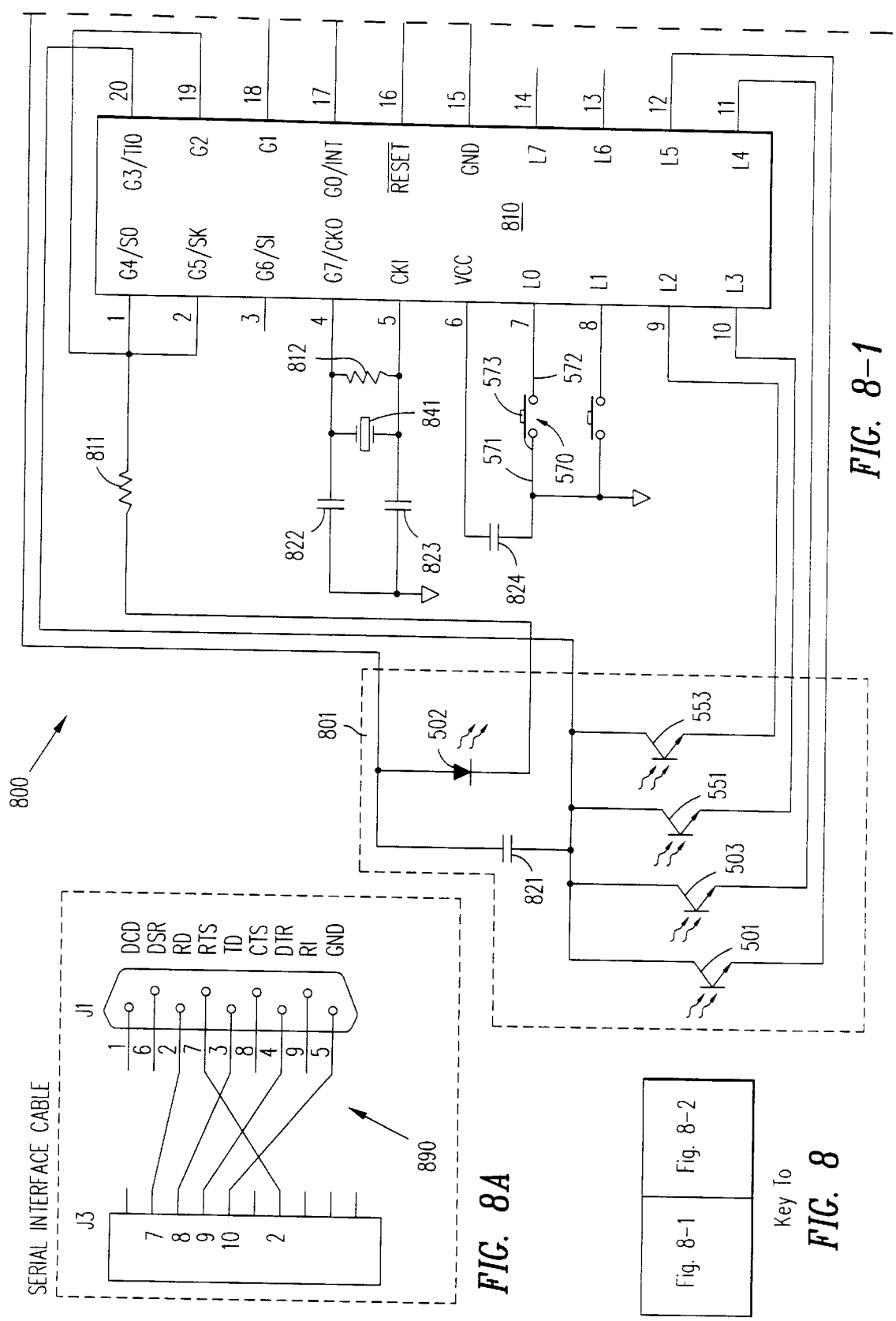

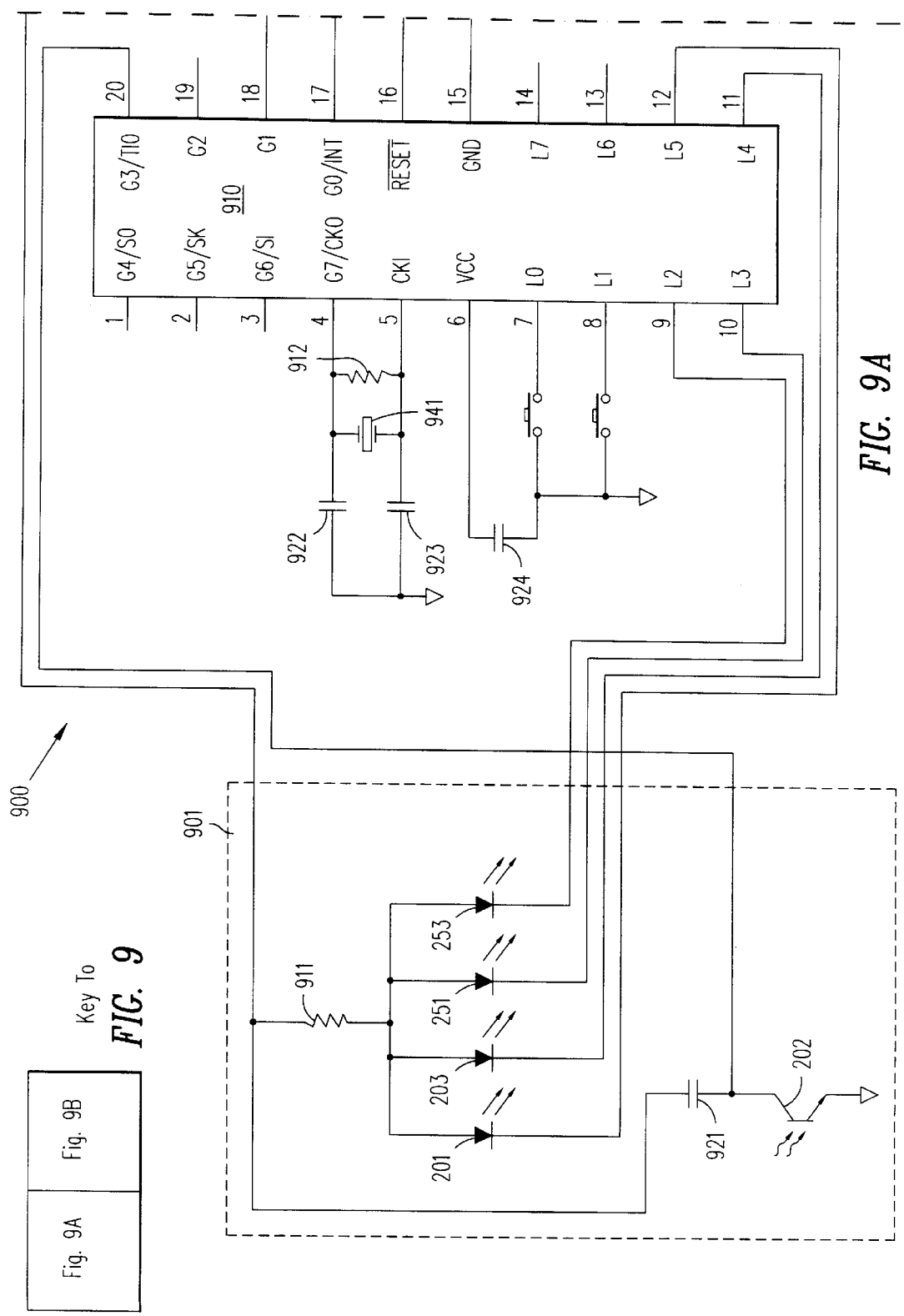

5,818,037

CONTROLLER USING A FLEXIBLE ELEMENT TO VARY LIGHT TRANSFERRED TO A PHOTOSENSITIVE ELEMENT

CROSS-REFERENCES TO RELATED APPLICATIONS

This application is related to U.S. Pat. No. 5,339,095, entitled "Multi-Media Pointing Device" issued Aug. 16, 1994, that is incorporated by reference herein in its entirety.

This application is also related to copending, commonly owned U.S. patent application Ser. No. 08/359,307, entitled "Position Sensing Method And Apparatus" by Peter M. Redford and Donald S. Stern that is incorporated herein by reference in its entirety.

This application is also related to commonly owned U.S. patent application Ser. No. 08/359,306, now U.S. Pat. No. 5,650,608, entitled "Method and Apparatus for Generating Ratiometric Control Signals" by Peter M. Redford and Donald S. Stern, now U.S. Pat. No. 5,650,608 issued on Jul. 22, 1997, that is incorporated herein by reference in its entirety.

REFERENCE TO MICROFICHE APPENDIX

Microfiche Appendix A (of 1 sheet and 32 frames) lists software for use in a microcontroller, is part of the present disclosure and is incorporated herein in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to a controller for generating an electrical signal indicative of the deformation of a flexible element of the controller. In particular this invention relates to a controller having a flexible element with a reflective surface that deforms and changes the intensity of an electromagnetic signal on a signal sensor, such as a phototransistor or a photodiode, wherein the electromagnetic signal is emitted by a signal source, such as a light emitting diode (LED).

BACKGROUND OF THE INVENTION

Conventional position sensing controllers typically control the operation of various devices, for example, an airplane, a robot arm, a crane, a helicopter and a video game machine. Position sensing controllers include, for example, a video game joy stick, also known as a "game controller" or a "game pad", that can control a game machine to play a video game, such as a flight simulator.

A game machine can be, for example (1) a computing device dedicated to executing video games; (2) a personal computer; or (3) an interactive television set top. Many conventional position sensing controllers use a potentiometer and suffer mechanical wear and tear caused by friction between a wiper and a resistive element typically used in the potentiometer.

Certain game controllers use a lever that controls four direction switches. Each direction switch controls movement of an object in one of four directions, e.g. North, South, East and West. Other game controllers include four direction switches connected to four keys of a keypad. Such switch-based game controllers limit a user to turning a direction switch on or off.

As an example of a prior art game controller, consider a racing car video game in which on pressing a left direction key, the game machine responds by turning a car left, in an "all or nothing" action. Such response creates difficulty in controlling the car in the video game with precision, for example as in a real-life car. In some games, the car's turning angle depends on the amount time the steering wheel is held in a turned position. Alternatively, use of an "all or nothing" switch can be analogized to steering a real-life car by touching a push-button switch that turns the wheels to a set position at a predetermined angle, such as 20°.

Devices based on push-button switches include, for example a control box as disclosed by U.S. Pat. No. 5,059,958, issued Oct. 22, 1991 to Jacobs et al. in which "The appropriate signal is generated by employing encapsulated mercury bulb switches" (Col. 3, lines 24–28). The mercury switches have "a series of incremental reservoirs wherein each reservoir has two electrodes that are shorted when the ball of the conductive fluid is manipulated into any one of the reservoirs". (Col. 3, lines 12–16).

SUMMARY OF THE INVENTION

In accordance with this invention, a controller (also referred to as a position sensing controller) has a substrate (e.g. a printed circuit board, also referred to as "PCB") and at least a signal source and a signal sensor mounted on the substrate. The signal source and the signal sensor can be optical elements, such as a light emitting diode (also referred to as "LED") and either a photodiode or a phototransistor.

The controller also includes a flexible element that initially has a first shape and that elastically deforms into a second shape on application of a force. The flexible element is located adjacent to the substrate, opposite to the signal source and the signal sensor. The flexible element is opaque and acts as a signal gate that initially transfers a first portion of an electromagnetic signal (e.g. light signal) from the signal source to the signal sensor when the signal source generates the electromagnetic signal. On application of a force, the flexible element deforms into the second shape, and transfers a second portion of the electromagnetic signal to the signal sensor. On cessation of application of the force, the flexible element reverts back to the first shape, and so transfers the first portion of the electromagnetic signal to the signal sensor. The flexible element can be formed of any elastically deformable material (such as polyvinyl chloride).

In one specific embodiment, a number of photodiodes (e.g. two or four) are mounted symmetrically around a single LED. The photodiodes can be connected in a voltage divider configuration to form a ratiometric sensor that is substantially immune to noise as described more completely below. In this embodiment, the first shape of the flexible element is substantially flat so that the flexible element initially transfers substantially the same portion of light to each of the photodiodes. On application of a force, the flexible element deforms into a second shape, such as an "S" shaped cross-section including a convex surface and a concave surface.

The concave surface transfers a larger portion of light to a first photodiode than was transferred by the flexible element in the flat shape. Similarly, the convex surface transfers a smaller portion of light to a second photodiode than was transferred by the flexible element in the flat shape. The actual portion of light being transferred depends on the curvatures of the concave surface and of the convex surface that in turn depend on the magnitude of the applied force.

The portion of light transferred by the flexible element in the second shape as measured by an electrical signal (also called "ratiometric" signal) generated at a junction between the two photodiodes can be calibrated against a deformation angle θ of the flexible element, and the calibrated values can be used later to estimate the flexible element's deformation. Such an estimate of deformation can be used to control, for example, movement of a cursor on a monitor of a personal computer (PC) based on deformation of the flexible element during operation of the controller.

In one embodiment of the controller, the flexible element is supported by a support member, such as a cylindrical wall that is integrally connected at the periphery of the flexible element to form a cup. In this specific embodiment, the cup and the substrate together form an enclosure in which the signal sensor and the signal source are sealed. Such sealing eliminates contamination by ambient light and by dust, either of which can interfere with or otherwise affect light received by a photosensitive element. Also, use of a flexible element as described above eliminates moving parts, and therefore provides a long life for the above-described controller, as compared to prior art controllers.

Instead of using a finger to deflect the flexible element, other embodiments of a controller can include a stem integrally connected to a central region of the flexible element, with a force being applied through the stem to the flexible element. A grip, such as a grip of a hollow cylindrical shape (also called a "cylindrical grip") can be mounted on the stem to provide friction, e.g. between a user's hand and the controller and thereby provide greater ease of use than in the absence of such a grip. Also, the small number of parts and the simple design of the controller as compared to the prior art controllers provides an economic advantage through savings in material costs as well as labor costs.

Instead of a cylindrical grip, a grip of a hemispherical shape, (also called "hemispherical grip") can be used to simulate a conventional trackball controller. A controller with such a hemispherical grip is thinner than a trackball controller because half of the volume occupied by a spherical trackball in a conventional controller is eliminated by use of a hemispherical grip. Moreover, a controller with a hemispherical grip has an improved response time and accuracy compared to a conventional controller, because the hemispherical grip need be only partially rolled, e.g. a fraction of a complete 360° rolling for a conventional spherical trackball.

In addition to the above discussed parts, a controller can include a power switch that operates on application of a force to the flexible element. For example, a power switch can be mounted on the support member (e.g. on the inside or on the outside of a cylindrical wall in two variations of this embodiment) and used to turn on and off electric power to the signal source.

Specifically, in one embodiment, the switch includes a conductive ring, such as a metal ring, having a height larger than the height of the cylindrical wall so that when a force is applied to the flexible element, the ring contacts the substrate (described above) of the controller. The ring forms a conductive path between two traces on the substrate, i.e. closes the switch, on application of the force. In this embodiment, the cylindrical wall has a height almost the same as the height of the ring so that if the applied force is sufficiently large to deform the ring, the cylindrical wall contacts the substrate and acts as a stop to prevent further deformation of the ring.

In another embodiment, the switch includes a conductive strip (such as a metal strip) having a first end attached to a first trace on the substrate and a second end located adjacent to a second trace on the substrate. The strip makes contact with the second trace to close the switch on application of the force, and brakes contact with the second trace to open the switch on cessation of application of the force.

Use of such a switch allows a controller to draw no power when no force is applied to the controller's stem. The controller automatically draws power as soon as a force sufficient to close the switch is applied. Thereafter, the controller continues to draw power to send a signal, for example to a remote host, and then automatically turns itself off. Therefore use of a switch as described above eliminates loss of power, for example, through a trickle current typically used in prior art controllers.

BRIEF DESCRIPTION OF THE DRAWINGS

FIG. 8A illustrates the connection of circuit 800 of FIG. 8 to a port of a personal computer.

DETAILED DESCRIPTION

Figure 1A:
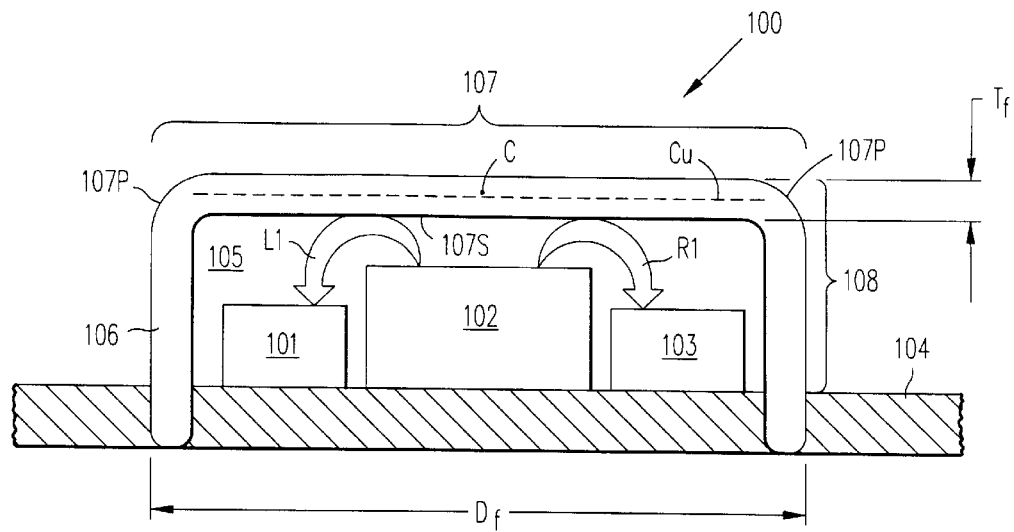
FIGS. 1A–1B illustrate in cross-sectional views a flexible element in an initial shape and in a deformed shape respectively, which flexible element is used to vary the light transferred to two photodiodes from a light emitting diode on application of a force F.

In one specific embodiment of this invention, a controller 100 (FIG. 1A) includes a number of optical elements 101–103 mounted on a substrate, such as a printed circuit board ("IPCB") 104. Optical elements 101–103 are enclosed within an enclosure 105 formed by a cup 106 mounted on PCB 104. Cup 106 includes a flexible element 107 having a periphery 107P at which is integrally connected a cylindrical wall 108. Cylindrical wall 108 of cup 106 is mounted on PCB 104.

In one specific variant of this embodiment, optical elements 101 and 103 are photodiodes and optical element 102 is a light emitting diode (LED). A first photodiode 101 receives a portion L1 of light emitted by LED 102, while a second photodiode 103 receives a portion R1 of light from LED 102. Initially flexible element 107 is substantially flat, e.g. a center line Cu of flexible element 107 is a straight line. Hence, portions L1 and R1 are substantially equal, e.g. L1=R1.

Figure 1B:
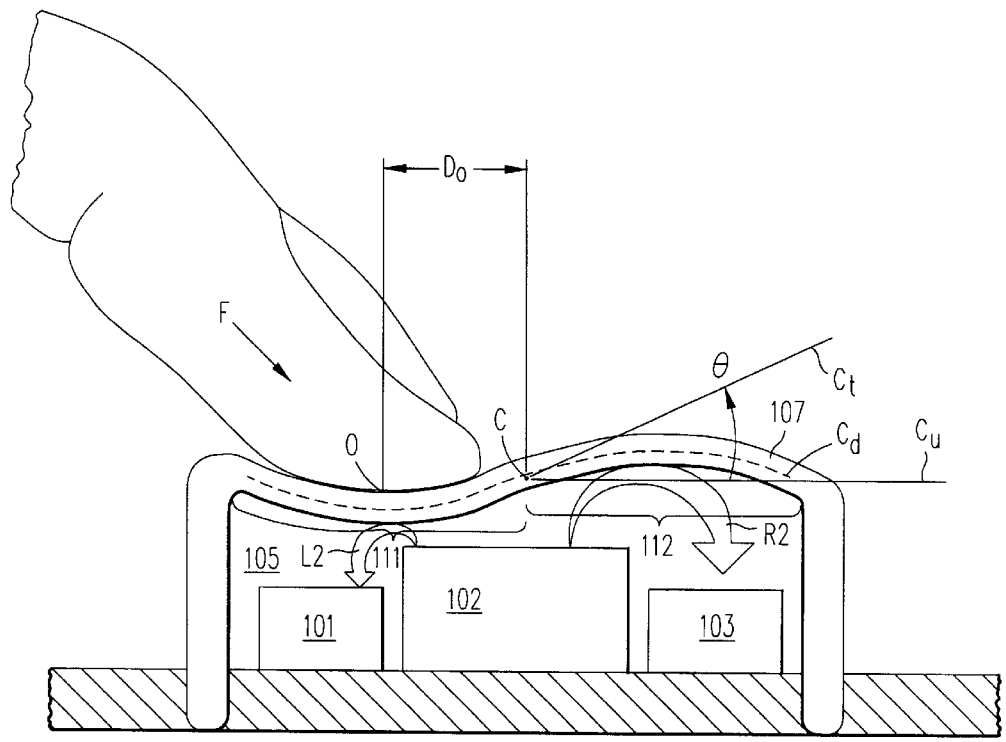

Flexible element 107 has a thickness Tf that is at least an order of magnitude smaller than another dimension, such as diameter Df of flexible element 107. Such a small thickness Tf allows flexible element 107 to flex, i.e. deform elastically into a deflected shape, such as an "S" shaped cross-section as illustrated in FIG. 1B on application of a force F, for example by a user's finger.

Specifically, when force F is applied at a point O at a distance Do from center C of flexible element 107, flexible element 107 deforms into an "S" shaped cross-section formed by a convex surface 111 (convex facing optical elements 101–102) and a concave surface 112 (concave facing optical elements 102–103).

In this embodiment, convex surface 111 is centered at point O underneath the point of application of force F, and transfers a portion L2 of light from LED 102 to photodiode 101. Portion L2 is smaller than portion L1 transferred when flexible element 107 is substantially flat. Concave surface 112 is formed at a distance from point O, and transfers a portion R2 of light from LED 102 to photodiode 103. Portion R2 is larger than portion R1 transferred when flexible element 107 is substantially flat.

When portion L2 is smaller than portion R2, photodiode 101 generates a smaller electrical signal than photodiode 103. Intensities of portions R2 and L2 depend on a deformation angle θ formed at center C between a straight line Ct and another straight line Cu. Line Ct is tangential to a center line Cd (shown dotted in FIG. 1B) of flexible element 107 in the deflected shape (FIG. 1B), while line Cu is a center line (shown dotted in FIG. 1A) of the flexible element in the undeflected initial shape (FIG. 1A). Deformation angle θ can be measured using circuitry of the type illustrated in FIG. 7 (as described below).

Figure 2A:
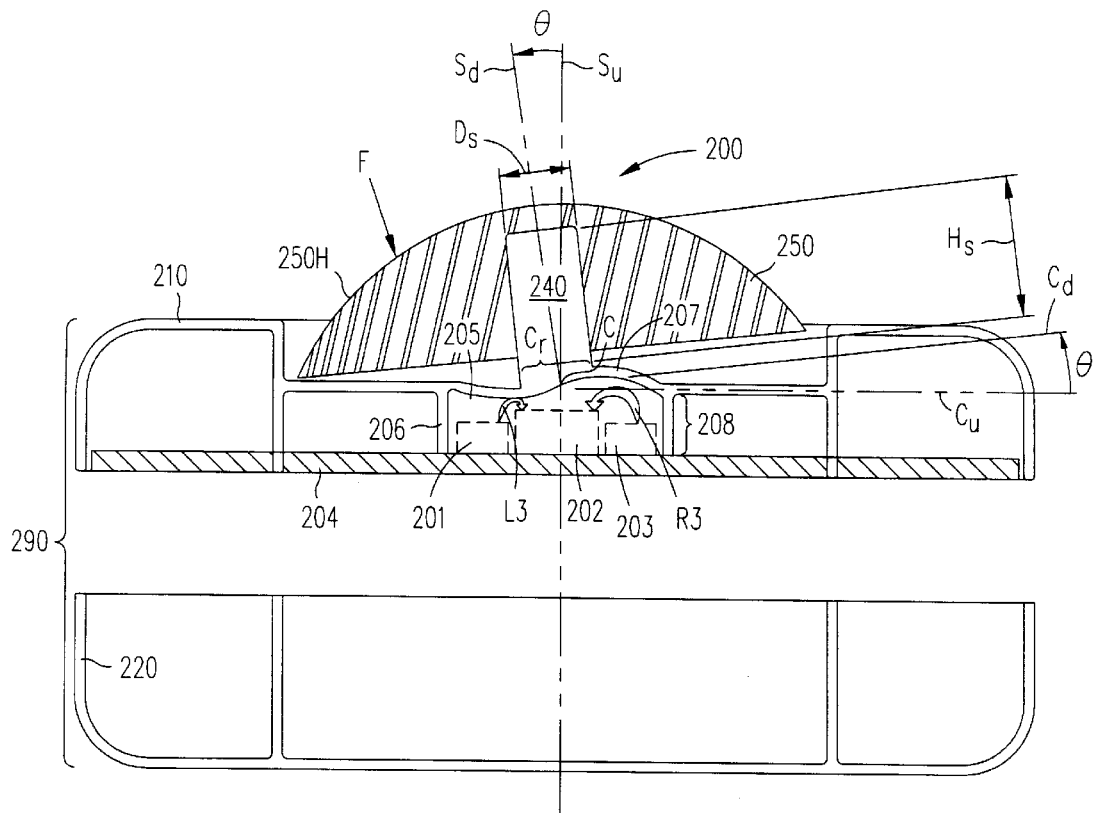
FIG. 2A illustrates the use of a flexible element in a controller in one embodiment of this invention.

Deformation angle θ can also be formed by application of a force to a stem, e.g. stem 240 in FIG. 2A, which stem is integrally connected to a flexible element, e.g. flexible element 207 in a region Cr surrounding center C. Many of the reference numerals in FIGS. 2A–2C, 3A–3B, 4, 5A–5B and 6A–6D are derived from reference numerals of the corresponding features in FIGS. 1A–1B, for example by adding 100, 200, 300, 400 and 500 respectively.

Stem 240 has a diameter Ds that can be of the same order of magnitude as a height Hs of stem 240 (see also FIG. 2C), to ensure that flexible element 207 flexes (rather than flexure of stem 240) when force F is applied. In one specific embodiment, diameter Ds is 0.13 inch and height Hs is 0.26 inch.

Figure 2B:
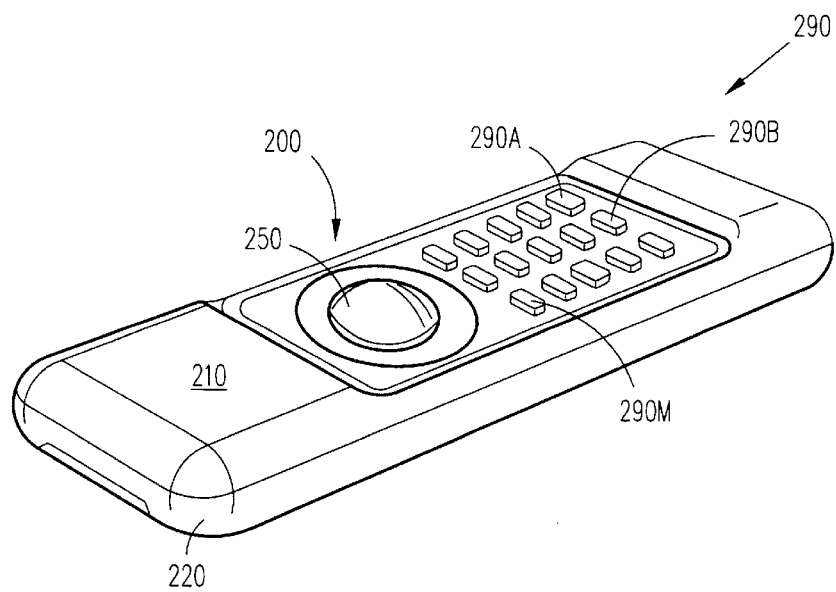
FIG. 2B illustrates the use of the controller of FIG. 2A in a remote control.
Figure 2C:
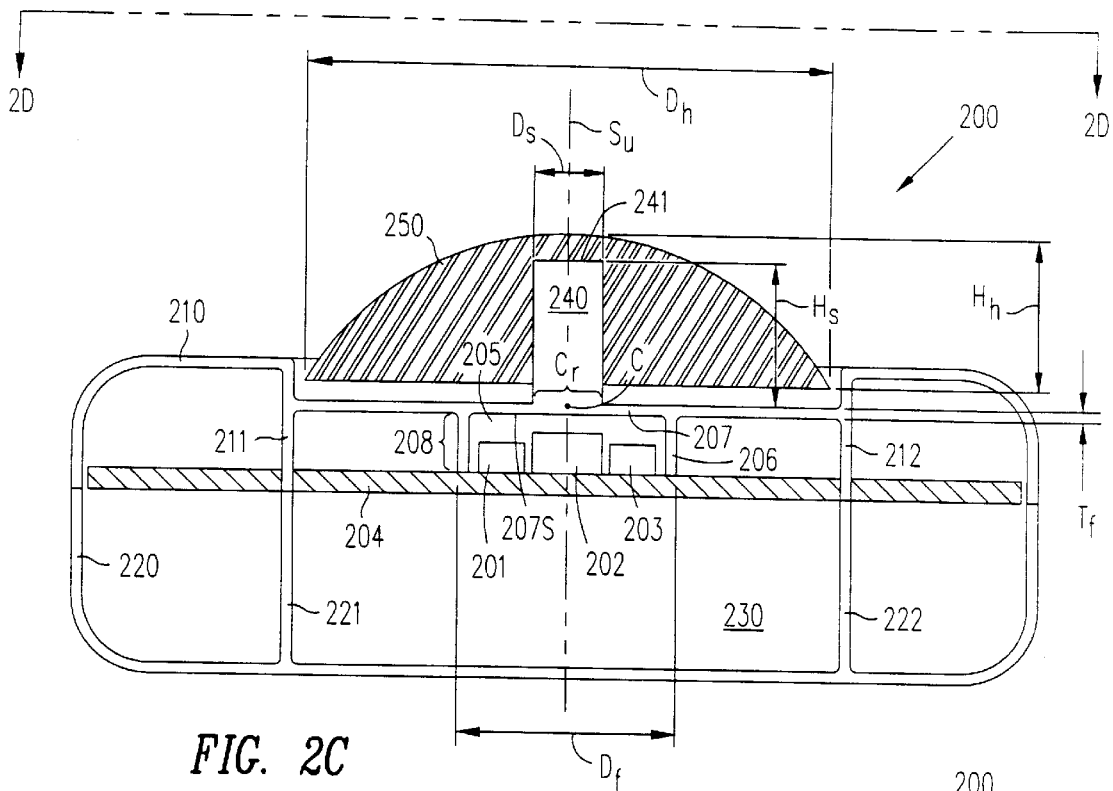
FIGS. 2C and 2D illustrate a cross-sectional view and a plan view respectively of the controller of FIG. 2A.

Cup 206 of controller 200 can be formed as an integral part of an upper cover 210 of a remote control 290, as illustrated in FIGS. 2A–2B. Remote control 290 includes a lower cover 220 that is attached (e.g. with glue) to upper cover 210 to form a sealed enclosure 230 in which is held a substrate, e.g. printed circuit board 204.

Stem 240 has an end 241 (FIG. 2C) located at a distance Hs from flexible element 207. In one particular embodiment, on movement of end 241 through an angle θ formed by a first center line Su (see undeflected initial shape illustrated in FIG. 2C) and a second center line Sd (see deflected shape illustrated in FIG. 2A), flexible element 207 also deforms by the same angle θ. On such deformation, flexible element 207 assumes an "S" shaped cross-section of the type discussed above in reference to FIG. 1B.

In this particular embodiment, optical elements 201 and 203 are light emitting diodes, while optical element 202 is a phototransistor, so that on deformation of flexible element 207 as described above, phototransistor 202 receives a greater amount of light from one of LEDs 201 and 203, and a smaller amount of light from the other of LEDs 201 and 203.

Also in this particular embodiment, controller 200 includes a grip 250 having a hemispherical shape 250H and mounted snugly (optionally with glue) on stem 240, thereby to mimic the appearance of a conventional controller having a spherical trackball. On application of force F on grip 250 (FIG. 2A), stem 240 deflects through the deformation angle θ discussed above. Grip 250 can be formed of plastic material with a smooth or textured surface.

Furthermore in this particular embodiment, flexible element 207 has a diameter Df, e.g. 0.55 inch, and a thickness Tf, e.g. 0.20 inch. Also in this particular embodiment, flexible element 207 is formed of a black opaque plastic material and surface 207S of flexible element 107 is painted white. The flexible element's material can be an injection molded plastic material, such as HYDEX® 4101 available from A. L. HYDE Company, 1 Main Street, Grenlock, N.J. 08032. Alternatively, any material that is less brittle than and easier to machine than polyethylene terepthlate (also known as "PET") or delrin (both available from A. L. HYDE listed above) and having the same strength and wear resistance as nylon can be used to form a flexible element in other embodiments.

Also, in one particular embodiment, the flexible element has a flexible modulus of elasticity of 350,000 psi, and with the above discussed exemplary dimensions flexible element 202 deforms through a maximum deformation angle θmax of around 3°. In this specific embodiment, flexible element 207 transitions within 30 milliseconds from a deformed shape to a substantially undeformed shape (such as a shape wherein deformation angle θ is less than 0.01 θmax).

The material of the flexible element can be chosen such that the response time for a flexible element to revert back to a substantially undeformed shape is preferably within a few frame periods (wherein each frame period is the time required for a display refresh by a personal computer) after cessation of application of force by a user. For example, a flexible element can be designed to have a response time of 100 milliseconds, for a 30 frames per second display refresh rate.

A flexible element formed of a harder material is stronger than and springs back faster than a flexible element formed of a softer material. Therefore a flexible element formed of a harder material is preferred in certain embodiments. Moreover, although injection molded plastics are preferred in certain embodiments, a flexible element can be formed of other materials such as beryllium copper (an alloy of copper and nickel) that has the advantage of being a harder material and of being solderable by conventional soldering methods.

Figure 2D:
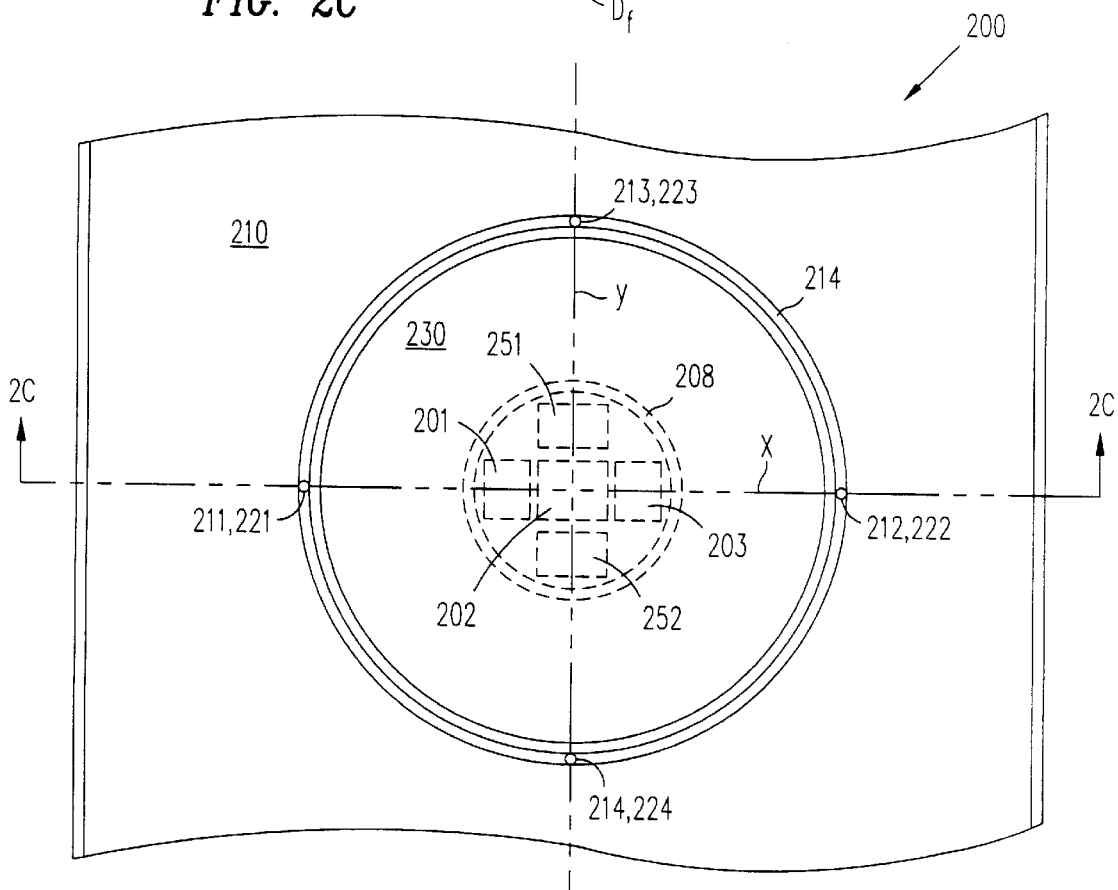
Figure 3A:
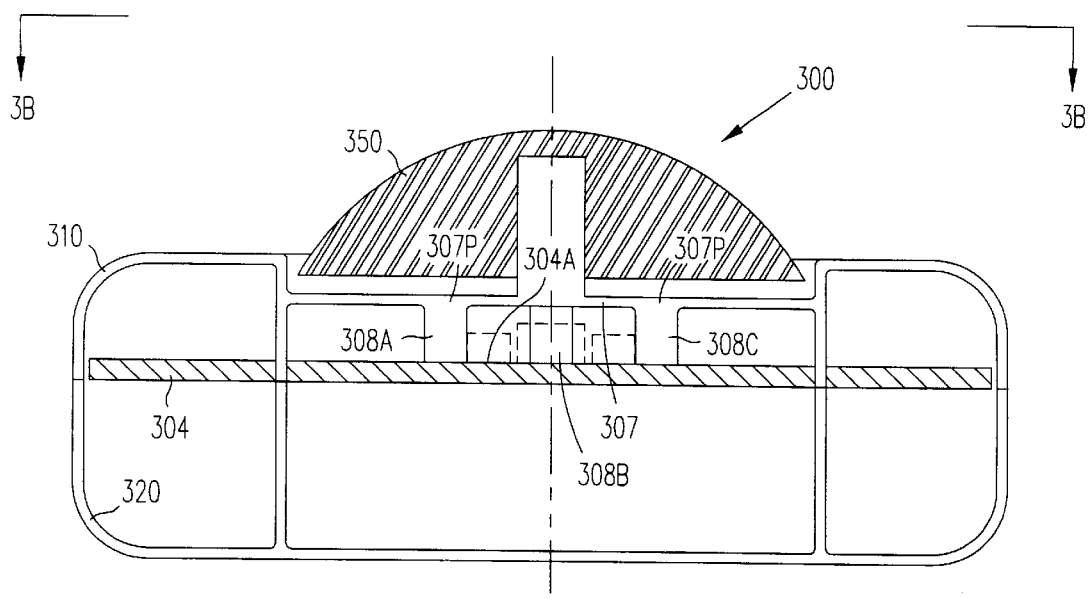
FIGS. 3A and 3B illustrate an alternative embodiment of a controller using a flexible element.
Figure 3B:
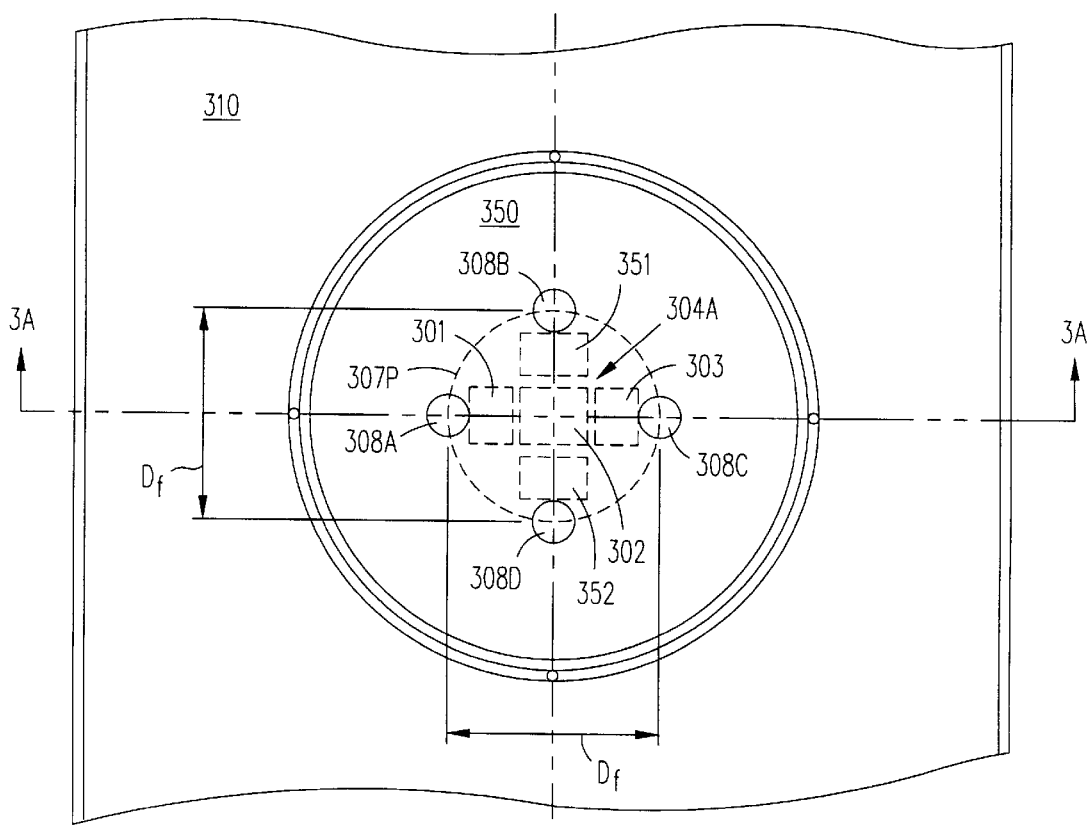

In one particular embodiment, phototransistor 202 is placed directly underneath center C of flexible element 207 while a pair of light emitting diodes 201 and 203 are placed along a straight line X passing through phototransistor 202. Another pair of LEDs 251 and 252 are placed along another straight line Y perpendicular to line X and passing through phototransistor 202. So, LEDs 201, 203, 251 and 252 can be placed symmetrically around phototransistor 202, at 90° angles around a circle as illustrated in FIG. 2D, to thereby allow controller 200 to sense movement of end 241 in any direction between lines X and Y.

Figure 9B:
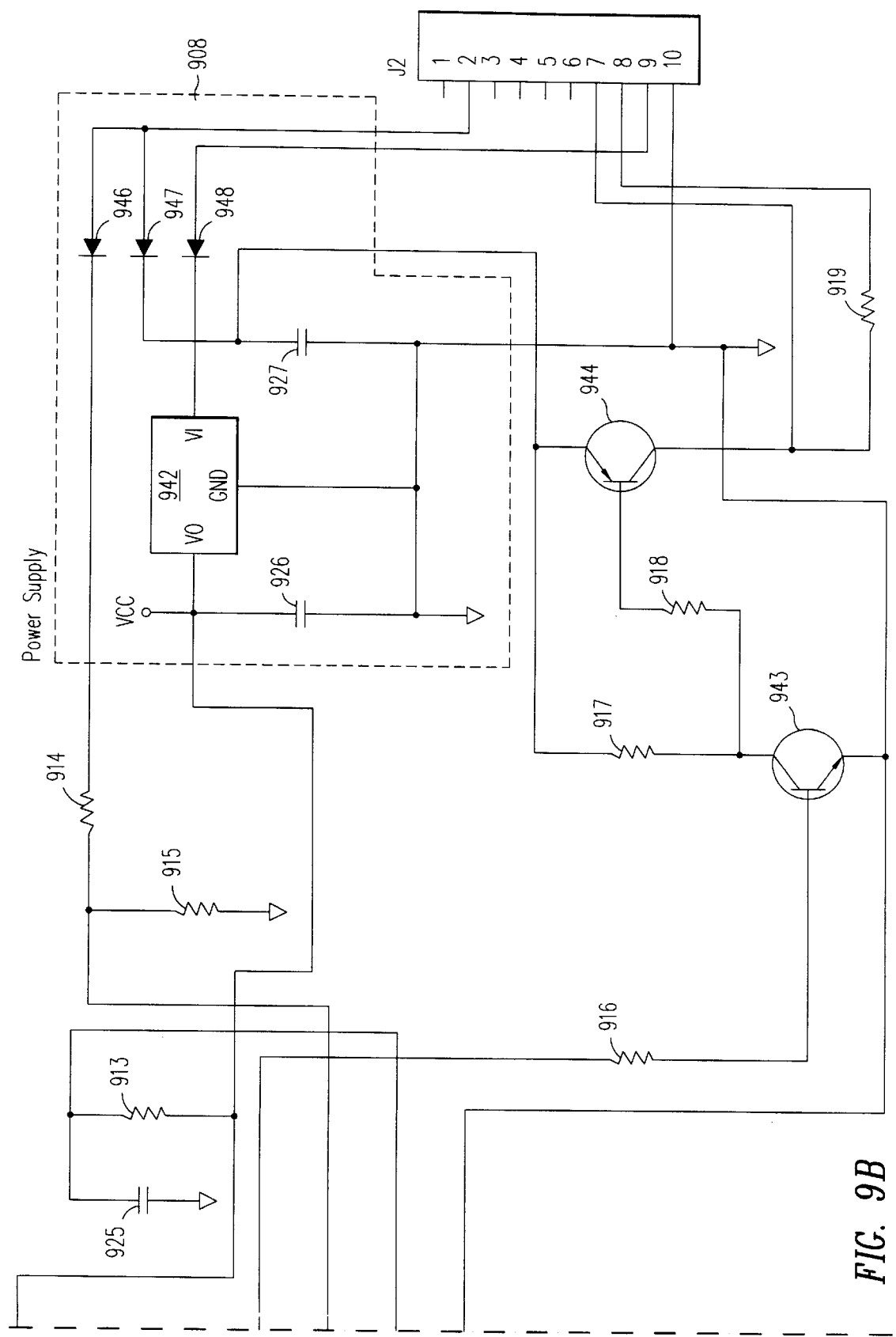

LEDs 201, 203, 251 and 252 need not be operated continuously during operation of controller 200. For example, in one embodiment, each one of LEDs 201, 203, 251 and 252 is pulsed sequentially and during each pulsing step the electrical signal generated by phototransistor 202 is measured, and the measurement is transmitted to a host device. A circuit for use in remote control 290 is illustrated in FIG. 9 (described below).

Use of a cylindrical wall 208 to support flexible member 207 and also to form a sealed enclosure 205 to contain printed circuit board 204 as described above eliminates contamination by dust that can reduce the light received by phototransistor 202. Moreover, such an enclosure prevents substantially all ambient light from reaching phototransistor 202 and so reduces errors in operation of controller 200.

Instead of cylindrical wall 208, any other support member can be used in other embodiments. For example, controller 300 (FIGS. 3A–3B) includes a number of posts 308A–308D as support members placed at periphery 307P of flexible element 307. Optical elements 301–303 and 351–352 are placed in an area 304A of printed circuit board 304 covered by flexible element 307 and surrounded by posts 308A–308D. Any type of support member instead of posts can be used to support flexible element 207, as long as the support member allows flexible element 207 to transition back and forth between an undeflected initial shape (sometimes referred to as simply "initial" state) and a deflected shape without collapsing during such transitions.

Also, instead of a hemispherical grip, any other grip, such as a grip 450 (FIG. 4) having a hollow cylindrical shape can be used in a controller in other embodiments of this invention. Grip 450 can be formed of rubber or plastic material with a textured surface to provide friction between a user's hand and the controller and thereby facilitate ease of use than in the absence of grip 450.

Moreover, although in one embodiment, flexible element 207 (FIGS. 2A, 2C) is formed as an integral portion of upper cover 201, in other embodiments, flexible element 507 (FIG. 5A) is not attached to upper cover 510. In controller 500, flexible element 507 is formed as an integral portion of cup 506. Cup 506 has legs 506A–506B that are inserted into corresponding holes in PCB 504, to mount cup 506 on PCB 504. PCB 504 in turn is mounted on a number of posts 520A–520N (where N is the number of posts) of lower cover 520.

Figure 5A:
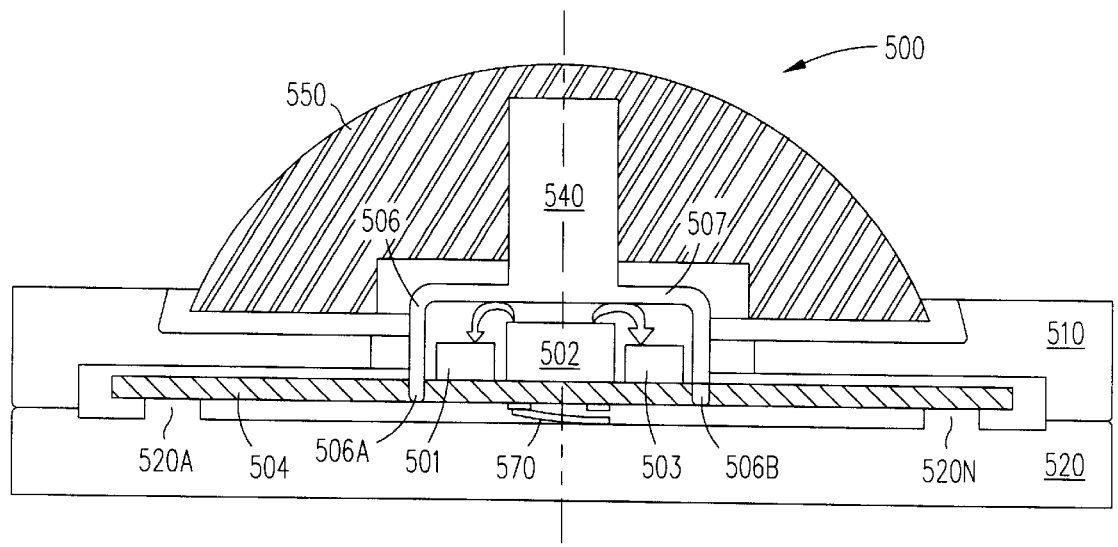
FIGS. 5A and 5B illustrate a controller having a switch that is operated on application of a force to a stem of the controller.
Figure 5B:
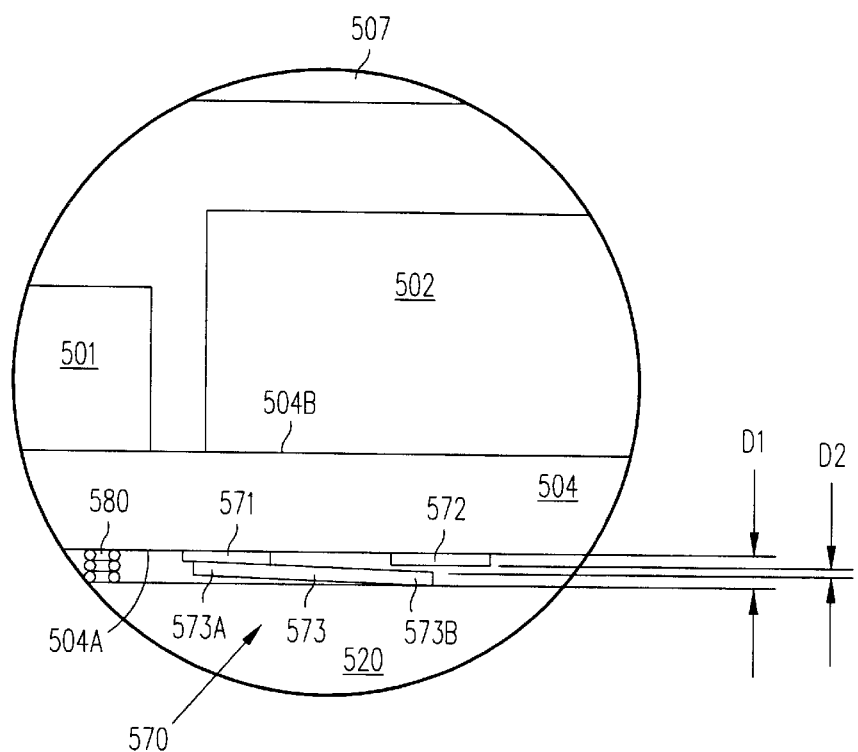
Figure 4:
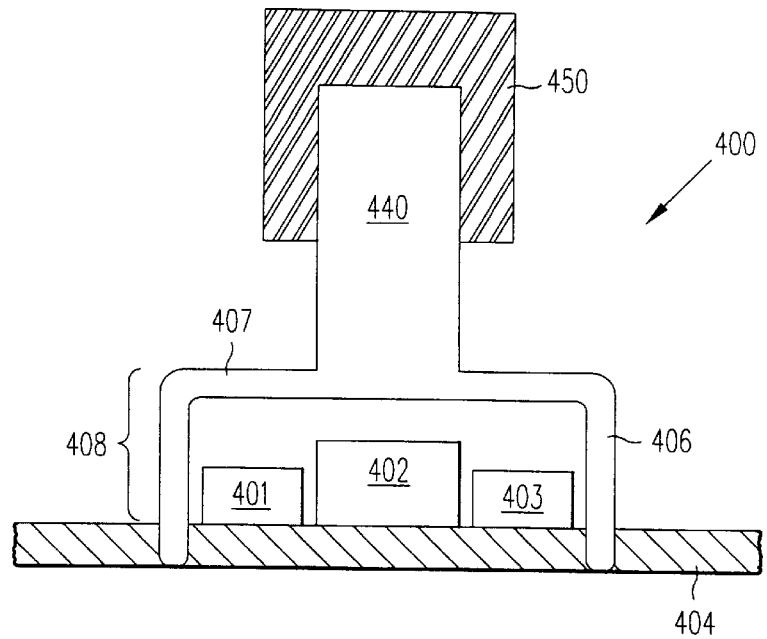
FIG. 4 illustrates a controller using a cylindrical grip for manipulating the flexible element.

In this particular embodiment, controller 500 includes a switch 570 shown in detail in FIG. 5B. Specifically, switch 570 includes a first trace 571 and a second trace 572 that are both formed on a side 504A (FIG. 5B) of printed circuit board 504. Side 504A is located opposite to side 504B that supports optical elements 501–503. Moreover, side 504A is adjacent to lower cover 520. Switch 570 also includes a flexure member 573 having a first end 573A connected to and in electrical contact with first trace 571. A second end 573B of flexure member 573 is located adjacent to second trace 572. Second end 573B and second trace 572 are separated by a distance D2 when printed circuit board 504 is at a distance D1 from lower cover 520.

On application of force F (FIG. 2A) printed circuit board 504 (FIG. 5B) moves through distance D2 until second end 573B contacts second trace 572. On such contact, switch 570 "closes", i.e. forms an electrical path between traces 571 and 572 through flexure member 573. Such closure of switch 570 can result in supply of electrical power to LED 502 (FIG. 5A) that in turn transmits light to phototransistors 501, 503 and 551, 553 (not shown in FIGS. 5A–5B). Electrical circuitry for use with optical elements 501–503, 551–553 and switch 570 in one embodiment described below in reference to FIG. 8.

In addition to posts 520A–520N, other support members, such as a spring 580 (FIG. 5B) can be placed between printed circuit board 504 and lower cover 520, to allow elastic deformation of printed circuit board 504 through distance D2 from an initial shape on application of force F, and revert back to the initial shape on removal of force F.

Although in one embodiment, switch 570 includes a flat strip as flexure member 573, a switch can be formed of other parts in other embodiments. For example, controller 600 (FIG. 6A) has a switch 670 formed of a ring 673 (e.g. formed of metal) mounted snugly on wall 608, and traces 671, 672 (FIGS. 6B–6D) formed on printed circuit board 604. In this particular embodiment, ring 673 is initially at a distance D3 from traces 671 and 672. On application of force F, ring 673 moves through distance D3 and touches traces 671 and 672 thereby to form an electrical path through ring 673 between traces 671 and 672. Wall 608 is initially at a distance D4 from printed circuit board 604, and acts as a stop when ring 673 deforms and cup 606 travels through distance D4.

Various optical elements described above, (such as optical elements 201–203, 251–252 in FIGS. 2A, 2C–2D) can be connected by any circuitry to measure the light incident on the photosensitive elements, e.g. phototransistors 201 and 203. Such measurements can be used to calibrate a controller for different angles θ. The calibrated measurements can be used to measure deformation angle θ on application of a force F, for example by a user playing a video game.

In one specific embodiment of the invention, controller 100 is coupled to a circuit 700 (FIG. 7) that interconnects the various optical elements 101–103, 151 and 152 into a ratiometric sensor 701 of the type described in the copending U.S. patent application entitled "Method and Apparatus for Generating Ratiometric Control Signals", Ser. No. 08/359,306 filed 19 Dec. 1994, now U.S. Pat. No. 5,650,608 issued on Jul. 22, 1997, and incorporated by reference above.

In sensor 701, an anode of photodiode 101 is connected to a cathode of photodiode 103. A junction 701A between the anode of photodiode 101 and the cathode of photodiode 103 is coupled to a pin 11 of a microprocessor 710. The cathode of photodiode 101 is coupled through a capacitor 721 to pin 11. Moreover, the anode of photodiode 103 is coupled to microprocessor 710's pin 10 that is internally connected to a first source of a first reference voltage VSS e.g. the ground reference voltage.

Similarly, the anode of photodiode 151 and the cathode of photodiode 152 are connected together at a junction 701B that in turn is connected to a pin 13 of microprocessor 710. The cathode of photodiode 151 is coupled through capacitor 722 to pin 13. The anode of photodiode 152 is coupled via pin 10 to voltage source VSS. An anode of LED 102 is connected to the cathodes of photodiodes 151 and 101 and to a pin 9 of microprocessor 710. Pin 9 is connected inside microprocessor 710 to a second source of a second reference voltage VDD, e.g. 3 volts. A cathode of LED 102 is connected through a resistor 715 to pin 5 of microprocessor 710. Resistor 715 is used to limit current through LED 102.

Resistors 711 and 712 each have one end connected to junction 701A and another end connected to pins 6 and 7 respectively of microprocessor 710. Similarly resistors 713 and 714 each have one end connected to junction 701B and another end connected to pins 8 and 14 respectively of microprocessor 710.

In this particular embodiment, microprocessor 710 measures the voltage level of an electrical signal (also called "ratiometric signal") at each of junctions 701A and 701B. Any noise in light incident on a pair of photodiodes connected to each other, e.g. photodiodes 101, 103, affects each photodiode in the pair equally. For example, the intensity of light may increase by 10% thereby decreasing the respective equivalent resistances R1 and R2 of photodiodes 101 and 103 to 90% of the initial values, i.e. 0.9 R1 and 0.9 R2.

The voltage level of the electrical signal at junction 701A is proportional to the ratio R1/(R2+R1) and remains unchanged in spite of such noise, because a scaling factor e.g. factor 0.9 is common to the numerator R1 and to the denominator (R2+R1) of the ratio and gets canceled. Such a low sensitivity to noise (that may be caused by power supply variations, or other extraneous light), allows the ratiometric signal to be sampled with any predetermined degree of precision, depending on the needs of the application, and eliminates costly filters and voltage regulators that are used in conventional circuits.

Microprocessor 710 implements a computer process that samples ratiometric signals from sensor 701. The computer source code for one embodiment of a computer process implemented by microprocessor 710 is listed in appendix A incorporated by reference above. The computer source code of appendix A can be assembled using the M68HC05P9 assembler and run on a microprocessor MC68HC05P1, both of which are available from Motorola, Inc. of Phoenix, Ariz.

Using the computer process of appendix A, microprocessor 710 initially turns on LED 102 by internally coupling pin 5 to a source of ground reference voltage and holding pin 11 in a high impedance input state, to thereby allow capacitor 721 to charge to the voltage level (also called "ratiometric" voltage level VR) present at the junction 701A (between anode of photodiode 101 and cathode of photodiode 103). Pin 13 is also held in a high impedance input state during this charging step.

After a predetermined time period, e.g. 2 milliseconds, capacitor 721 is charged and microprocessor 710 couples pin 6 internally to a source of ground reference voltage while determining the time $\Delta t$ (see FIG. 7A) needed for the electrical signal on pin 11 to transition from logic state 1 to logic state 0 i.e. discharge along curve 790 from the ratiometric voltage level, e.g. 2 volts to the voltage level VLT of logic threshold of microcontroller 110's pin 11, e.g. 1 volt).

Figure 7:
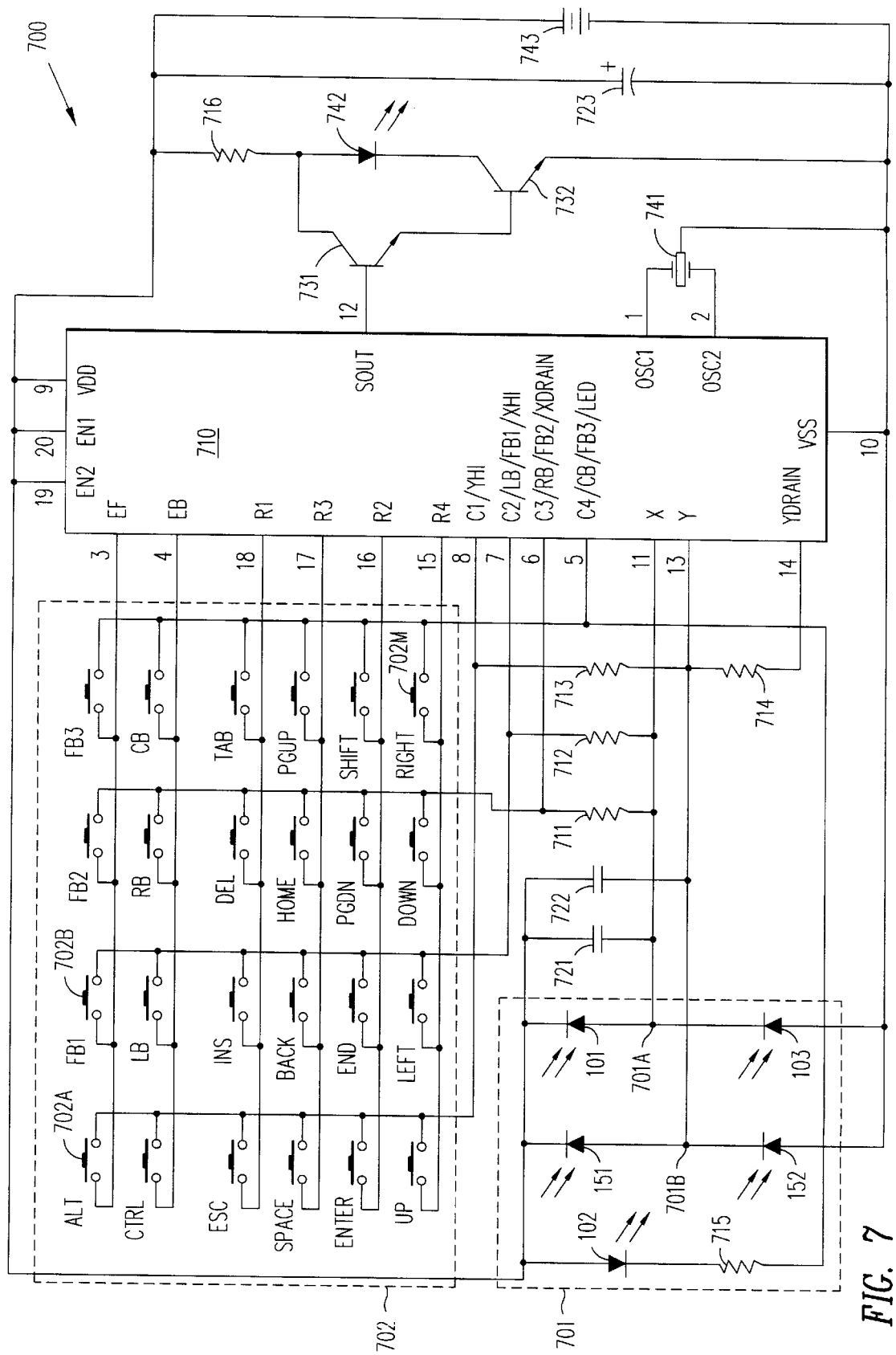
FIGS. 7, 8 (including FIGS. 8-1 and 8-2) and 9 (including FIGS. 9A and 9B) illustrate circuitry for use in controllers of the type illustrated in FIGS. 2A–2D, 3A–3B, 4, 5A–5B and 6A–6D.
Figure 7A:
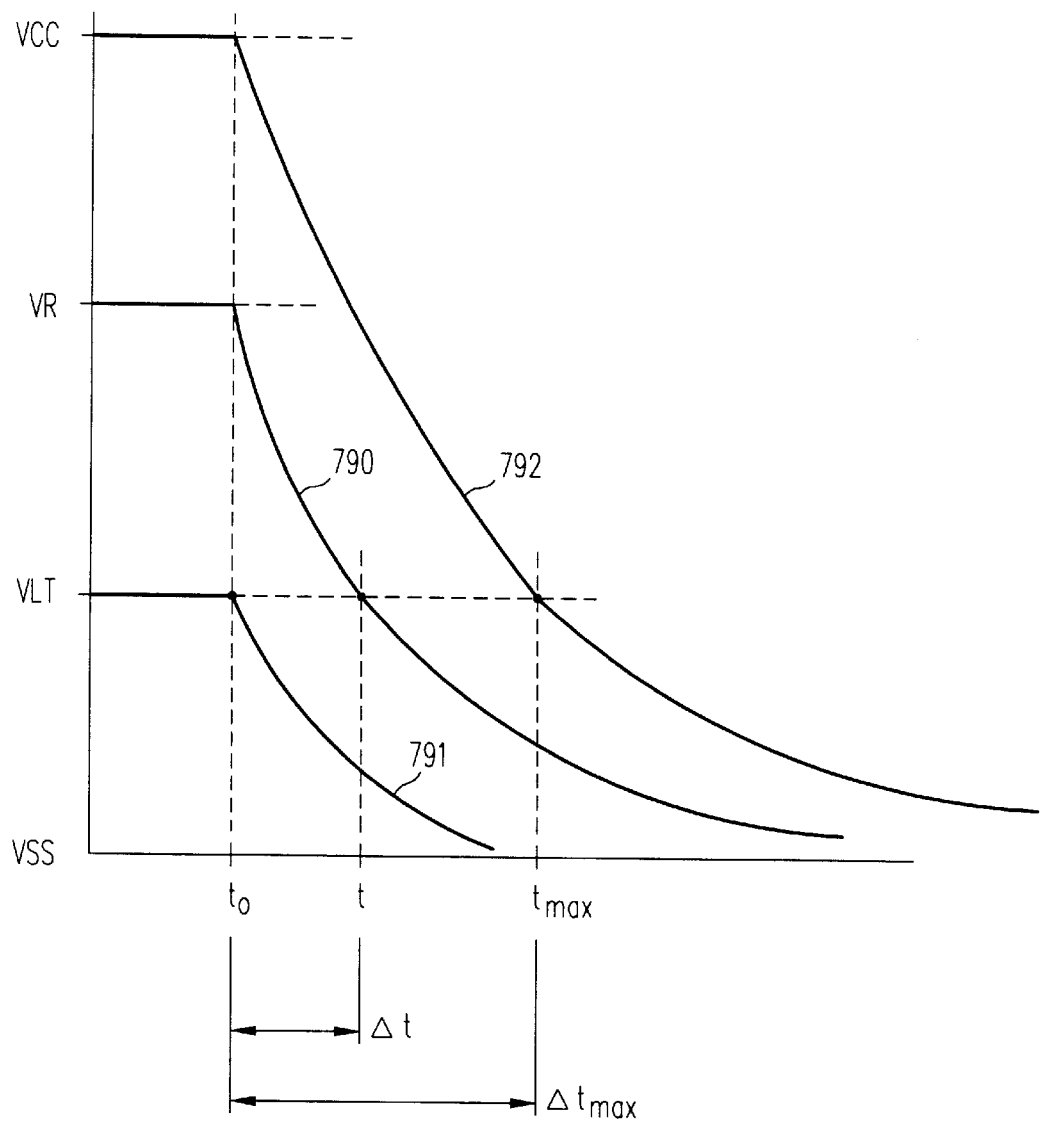
FIG. 7A illustrates measurement of the voltage level of an electrical signal by circuitry in FIGS. 7, 8 and 9.

In FIG. 7A, the maximum time $\Delta t max$ is the time required by pin 11 to discharge from level VCC to level VLT corresponding to a condition in which photodiode 101 (or alternatively photodiode 151) gets the maximum intensity (also called "amount") of light from LED 102, for example, when flexible element 107 is deformed into an extreme shape for a maximum deformation angle $\theta max$ of, for example, 3°, into a "S" shaped cross-section opposite to that shown in FIG. 1B.

Microprocessor 710 compares the determined time $\Delta t$ with a similarly determined time $\Delta tc$ for an undeformed initial shape, to thereby determine a time period $\Delta T$ which is proportional to the deformation angle $\theta$. $\Delta T = \Delta tc - \Delta t$. In one particular embodiment, the deformation angle is used to determine the direction and rate at which the cursor is moved on a display screen of a personal computer (not shown).

Then microprocessor 710 sends data indicative of the measured deformation angle $\theta$ to the personal computer or another electrically controllable device, through, for example, an infrared transmitter. In FIG. 7, an infrared transmitter is formed by transistors 731–732 and infrared LED 742 that are driven by a signal on pin 12 of microprocessor 710. Specifically, a voltage level indicative of logic state 1 on pin 12 turns on transistor 731. On being turned on, the emitter of transistor 731 supplies a current that turns on transistor 732. On being turned on, transistor 732 closes a current path through LED 742 and a resistor 716. Resistor 716 limits the current through LED 742. In this particular embodiment, capacitor 723 filters out noise in power supplied by battery 743 to microprocessor 710 and to LEDs 102 and 742. Noise can be caused by transistor 732 during switching of current through LED 742.

Figure 6A:
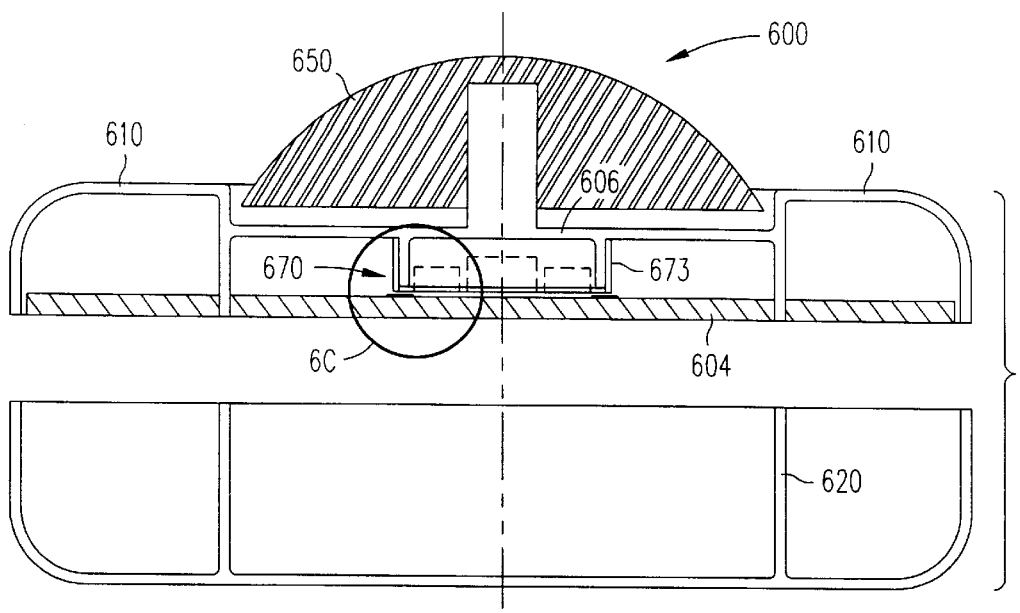
FIGS. 6A–6D illustrate another embodiment of a controller having a switch operated by application of a force.
Figure 6B:
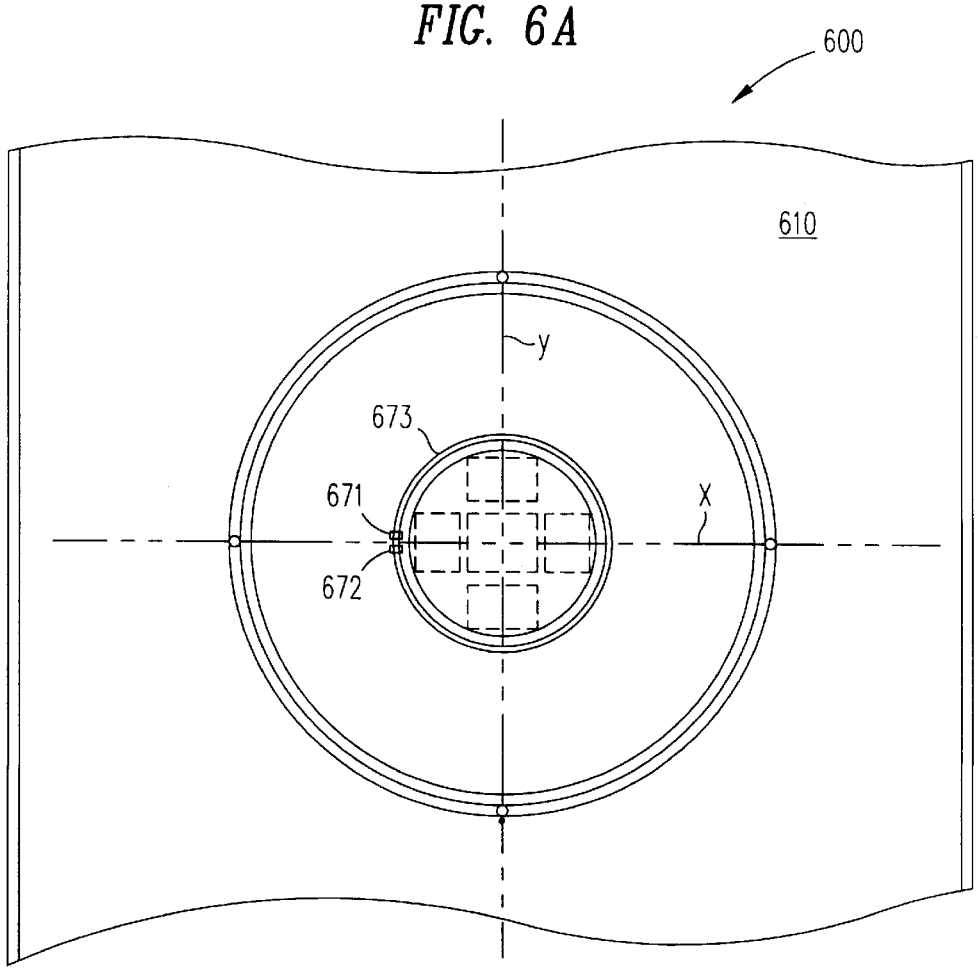
Figure 6C:
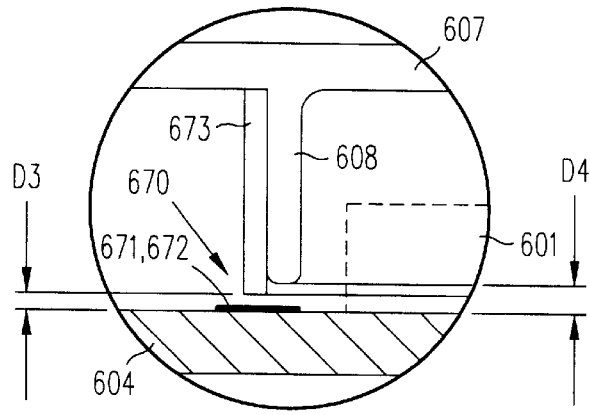
Figure 6D:
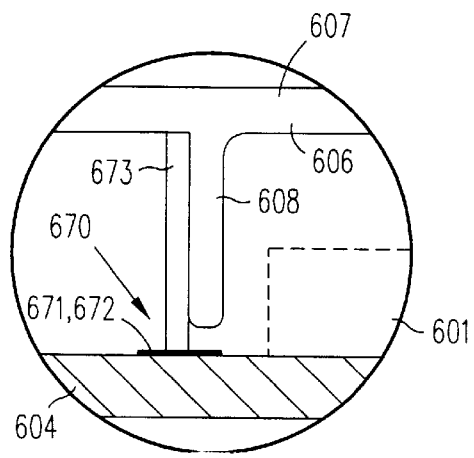

Also, in this particular embodiment, circuitry 700 can interconnect optional switches 702A, 702B . . . 702M (FIG. 2B), where M is the number of switches, as shown in box 702 (FIG. 7). Each of such optional switches 702A–702M is connected in a key matrix to two pins of microprocessor 710 and can be operated by a button (similar to buttons 290A–290M) to transmit a button code to a personal computer in a manner well known to a person skilled in the art of electrical engineering in view of the enclosed disclosure. See U.S. Pat. No. 5,339,095 incorporated by reference above. In circuit 700, switch labeled "CB" in box 702 is a power switch similar to one of switches 570, 670 (FIGS. 5B and 6C).

In one specific embodiment of the type illustrated in FIG. 7, ratings for various components are listed in Table 1:

TABLE 1

| Component | Rating |
|---|---|
| Photodiodes 101, 103, 151, 152 | BPW 34S (SIEMENS) |
| LED 102, 742 | SFH42ON (SIEMENS) SE1003 (NEC) |
| Oscillator 741 | KBR3.58MKS (Murata Erie) |
| Resistor 715 and 716 | 330 $\Omega$ and 1 $\Omega$ (Rohm) |
| Resistors 711, 714 | 3.9 M$\Omega$ (Rohm) |
| Resistors 712, 713 | 3 M$\Omega$ (Rohm) |
| Transistors 731, 732 | MMBT3904LT, MMBT4401LT (Motorola) |
| Capacitors 721, 722 | 0.001 $\mu f$ (Rohm) |
| Battery 743 | 3 v, AA size (Everready) |
| Capacitor 723 | 22 $\mu f$ (Rohm) |
| Microprocessor 710 | COP8 (National Semiconductor) |

Figures 2, 8:
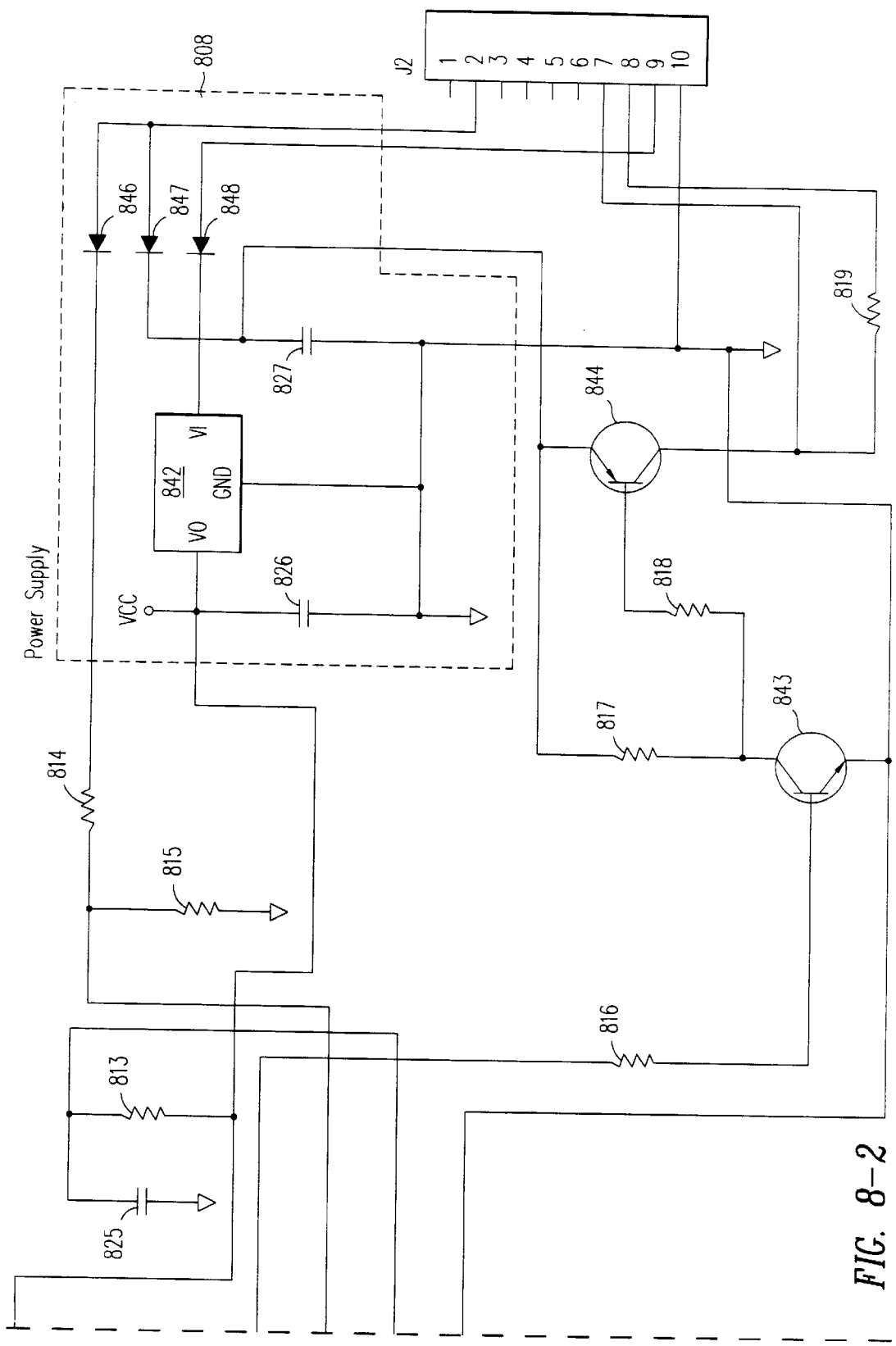

Although photodiodes are illustrated in FIG. 7, other photosensitive optical elements such as phototransistors can also be used, as illustrated in FIGS. 8 and 9.

In the embodiment illustrated in FIG. 8, microprocessor 810 sleeps in a low power mode waiting for an interrupt triggered by closure of switch 570. On occurrence of such an interrupt signal, the collector of each of phototransistors 501, 503, 551 and 553 is coupled through a capacitor 821 to a power supply source 808 that supplies an electrical signal at a reference voltage VCC, e.g. 3 volts. The emitter of each of phototransistors 501, 503, 551 and 553 is coupled to pins 12, 11, 10 and 9 respectively of microprocessor 810.

Moreover, LED 502 has an anode coupled to power supply source 808 and a cathode coupled through a resistor 811 to three pins 1, 2 and 19 of microprocessor 810. Such coupling to multiple pins allows microprocessor 810 to sink a larger current (approximately 3 milliamps) than possible by using one pin (approximately 1 milliamp).

Microprocessor 810 turns on LED 502 for each of phototransistors 501, 503, 551 and 553 sequentially, by simultaneously coupling pins 12 and 19 internally to ground. A junction between capacitor 821 and the collector of each of phototransistors 501, 503, 551 and 553 is coupled to a pin 20 of microprocessor 810. Microprocessor 810 internally connects pin 20 to a source of reference voltage indicative of logic state 1, for example, to a source of power reference voltage VCC for 2 milliseconds, and then drives pin 20 to a high impedance input state.

Thereafter, microprocessor 810 couples pin 12 (or alternatively pins 11, 10 or 9) to the source of ground reference voltage to thereby discharge capacitor 821 through photo transistor 501 (or alternatively one of transistors 503, 551 or 553). The greater the intensity of light on phototransistor 501, the faster capacitor 821 discharges. The discharge rate of capacitor 821 is measured by microprocessor 810 by monitoring the time taken by the electrical signal on pin 12 to reach a voltage level of logic threshold (e.g. 1.2 volt).

Circuit 800 includes a number of other components, such as transistor 843, 844, resistors 816, 817, 818 and 819 that are coupled between a connector J2 and pins 18 and 15 of microprocessor 810 to provide an interface to a cable 890 in conformance with the industry standard RS-232 as is well known to a person skilled in the art of electrical engineering.

Moreover, circuit 800 also includes a power supply 808 front of capacitors 826, 827 and diodes 846–848 and voltage regular 842 that are coupled in a manner well known to the person skilled in the art of electrical engineering. Moreover, circuit 800 also includes resistors 814 and 815 step down the voltage of an electrical signal received at pin 2 of connector J2 and supply the stepped down electrical signal to pin 17 of microprocessor 810 to thereby ensure that voltage level on pin 17 does not exceed the power reference voltage VCC. Such a step down of the voltage level of electrical signal supplied to pin 17 is necessary in a CMOS (complementary metal oxide semiconductor) integrated circuit chip 810 to prevent SCR (silicon control rectifier) latchup as is well known to a person skilled in the art of electrical engineering. This precaution is necessary because pin 17 is connected to a pin RTS of RS-232 port, that may have a maximum voltage of as high as 18 volts.

Capacitor 825 and resistor 813 are coupled to pin 16 of microprocessor 810 and are used to delay the rise time of a reset signal received at pin 16 during power up. Such delay is necessary to allow the power reference of voltage VCC supplied by power supply 808 to stabilize before microprocessor 810 performs the power on reset sequence.

In one specific embodiment of the type illustrated in FIG. 8, ratings for various components are listed in Table 2:

TABLE 2

| Component | Rating |
|---|---|
| Phototransistors 501, 503, 551, 552 | PS101W (STANLEY) |
| LED 502 | SFH42ON (SIEMENS) |
| Oscillator 841 | KBR3.58MKS (Murata Erie) |
| Resistor 811 | 220 Ω (Rohm) |
| Resistor 812 | 1 MΩ (Rohm) |
| Resistors 813, 814 | 470K Ω (Rohm) |
| Resistor 815 | 360K Ω (Rohm) |
| Resistors 816, 818 | 47K Ω (Rohm) |
| Resistors 817, 819 | 100K Ω (Rohm) |
| Transistor 843 | 2N3904 (Motorola) |
| Transistor 844 | 2N3906 (Motorola) |
| Capacitors 821, 824, 825 | 0.1 μf (Rohm) |
| Capacitor 822, 823 | 30 pf (Rohm) |
| Capacitor 826 | 4.7 μf (Rohm) |
| Capacitor 827 | 10 μf (Rohm) |
| Voltage regulator 842 | S-81233 PG (Seiko) |
| Diodes 846, 847, 848 | 1N4148 (Rohm) |

FIG. 8A illustrates the connection of circuit 800 via connector J2 (FIG. 8), connector J3 (FIG. 8A) and cable 890 to a port J1 of a personal computer (not shown). In this particular embodiment, port J1 conforms to the industry standard RS-232.

Circuit 900 (FIG. 9) is substantially similar to circuit 800 (FIG. 8) described above, except for sensor 901. Most of the reference numerals in FIG. 9 are derived from corresponding reference numerals in FIG. 8, for example, by adding 100. Circuit 900 can use the same components as those listed in Table 2 for circuit 800 (except for sensor 901).

Microprocessor 910 (FIG. 9) turns on each of LEDs 201, 203, 251 and 253 sequentially, by coupling each one of pins 12, 11, 10 and 9 internally to a source of a first reference voltage, e.g. the ground reference voltage. Moreover, microprocessor 910 allows capacitor 921 to charge to a power reference voltage, e.g. voltage VCC by coupling pin 20 to a source of power reference voltage VCC for 2 milliseconds. Then microprocessor 910 drives a signal on pin 20 to a high impedance input state and measures the amount of time required for the signal on pin 20 to reach the voltage level of logic threshold in a manner similar to that described above for circuit 800 (FIG. 8).

In each of circuits 800 and 900 described above, deformation angle θ is calculated from ΔT obtained by subtracting the time measurements Δt1 and Δt2 of a pair of optical elements positioned on the same line (e.g. line x or line y). For example, angle θ is determined by subtracting time measurements for phototransistors 501, 503 (sensor 801) and LEDs 201, 203 (sensor 901). The measured ΔT is used in the same manner as that described above for circuit 700.

In one specific embodiment of the type illustrated in FIG. 9, ratings for optical elements used in sensor 901 are listed in Table 3:

TABLE 3

| Component | Rating |
|---|---|
| LEDs 201, 203, 251, 252 | SHF402N (SIEMENS) |
| Phototransistors 202, 742 | BPW 34S (SIEMENS) |

Addresses of component suppliers in Tables 1–3 are listed below in Table 4:

TABLE 4

| Supplier | Address |
|---|---|
| Siemans | 19000 Homestead Road Cupertino, CA 95014 |
| NEC | 475 Ellis Street Mountain View, CA 94039 |
| Murata Erie | 2200 Lake Park Drive Smyrna, GA 30080 |
| Rohm | 3034 Owen Drive, Jackson Business Park, Antioch, TN 37013 |
| Motorola | P.O. Box 20912, Phoenix, Arizona 85036 |
| Everready or Energizer | Energizer U.S. Highway 441 North P.O. Box 147114 Gainesville, FL 32614-7114 |
| National Semiconductor | 2900 Semiconductor Drive P.O. Box 58090 Santa Clara, CA 95052-8090 |
| Stanley | 1500 Hill-Bradley Road, Battle Creek, Minnesota 49015 |
| Seiko | 2990 West Lomita Boulevard, Torrence, California 90505 |

Numerous modifications and adaptations of the above described embodiments are obvious to one skilled in the art in view of the enclosed disclosure. For example, a first optical element, such as an LED, can be mounted on the flexible element while other optical elements, such as photodiodes are mounted facing the first optical element on the substrate. As another example, a LED can have a power supply independent of the photodiode power supply, as long as the signal from the LED has a sufficient intensity to be received by the photodiode.

Many such modifications and adaptations of the above-described embodiments of this invention are encompassed by the appended claims.

We claim:

1. A controller comprising:

a first signal source capable of emitting an electromagnetic signal;

a first signal sensor capable of converting a portion of said electromagnetic signal incident on said first signal sensor into an electrical signal;

a flexible element located facing said first signal source and said first signal sensor, said flexible element being opaque and having a first shape;

wherein said flexible element in said first shape transfers a first portion of said electromagnetic signal from said first signal source to said first signal sensor; and wherein on application of a force to said flexible element, said flexible element deforms elastically into a second shape and transfers a second portion of said electromagnetic signal to said first signal sensor.

2. The controller of claim 1 wherein said reflective surface is substantially white.

3. The controller of claim 1 wherein said reflective surface is metallic.

4. The controller of claim 1 wherein:

said first signal sensor and said second signal sensor are coupled each to the other in series, with a first terminal of said second signal sensor being coupled to a second terminal of said first signal sensor; and on cessation of application of said force, said flexible element reverts to said first shape and transfers said first portion of said electromagnetic signal to said first signal sensor.

5. The controller of claim 4 wherein:

each of said first signal sensor and said second signal sensor is a photodiode; and said first terminal is a cathode and said second terminal is an anode.

6. The controller of claim 1 comprising a plurality of signal sources including said first signal source, said plurality of signal sources being mounted on said substrate around said first signal sensor.

7. The controller of claim 6 wherein said first signal sensor is a photodiode and further wherein said signal sources are light emitting diodes.

8. The controller of claim 7 wherein said flexible element in said second shape comprises a convex surface and a concave surface, further wherein said concave surface transfers a large portion of said electromagnetic signal to said first signal sensor than transferred by said flexible element in said first shape.

9. The controller of claim 7 wherein said force has a magnitude and further wherein said second portion depends on said magnitude.

10. The controller of claim 7 wherein said substrate is a printed circuit board interconnecting at least said control circuit, said first signal source and said first signal sensor.

11. The controller of claim 1 wherein:

said second portion of said electromagnetic signal incident on said first signal sensor has a magnitude dependent on an angle θ between two positions of a line tangential to said flexible element in said first shape and in said second shape; and on cessation of application of said force, said flexible element reverts to said first shape and transfers said first portion of said electromagnetic signal to said first signal sensor.

12. The controller of claim 11 further comprising:

a circuit coupled to said first signal sensor and said second signal sensor, said circuit generating a signal indicative of said angle θ.

13. The controller of claim 11 further comprising:

a line coupled to a common junction between said first signal sensor and said second signal sensor, said line carrying a signal indicative of said angle θ.

14. The controller of claim 13 further comprising:

a microprocessor having a pin coupled to said line.

15. A controller comprising:

a first signal source capable of emitting an electromagnetic signal;

a first signal sensor capable of converting a portion of said electromagnetic signal incident on said first signal sensor into an electrical signal;

a flexible element located facing said first signal source and said first signal sensor, said flexible element being opaque and having a first shape; and a wall surrounding and integrally connected to a periphery of said flexible element to form a cup, said first signal source, said first signal sensor and said flexible element being enclosed in an enclosure formed between said cup and said substrate;

wherein said flexible element in said first shape transfers a first portion of said electromagnetic signal from said first signal source to said first signal sensor; and wherein on application of a force to said flexible element, said flexible element deforms elastically into a second shape and transfers a second portion of said electromagnetic signal to said first signal sensor.

16. A controller comprising:

a first signal source capable of emitting an electromagnetic signal;

a first signal sensor capable of converting a portion of said electromagnetic signal incident on said first signal sensor into an electrical signal;

a flexible element located facing said first signal source and said first signal sensor, said flexible element being opaque and having a first shape; and a stem connected to a central region of said flexible element, said stem being capable of applying a force to said flexible element;

wherein said flexible element in said first shape transfers a first portion of said electromagnetic signal from said first signal source to said first signal sensor; and wherein on application of said force to said flexible element, said flexible element deforms elastically into a second shape and transfers a second portion of said electromagnetic signal to said first signal sensor.

17. The controller of claim 16 wherein said stem has a movable end located away from said flexible element, and said stem pivots about a pivot point located in a central portion of said flexible element to thereby deform said flexible element in response to movement of said movable end.

18. The controller of claim 16 further comprising a grip mounted on said stem, said grip having a cylindrical shape.

19. The controller of claim 16 further comprising a grip mounted on said stem, said grip having a hemispherical shape.

20. The controller of claim 16 wherein:

said stem has a movable end located away from said flexible element, and said stem pivots about a pivot point located in a central portion of said flexible element and deforms said flexible element in response to movement of said movable end; and on cessation of application of said force, said flexible element reverts to said first shape and transfers said first portion of said electromagnetic signal to said first signal sensor.

21. The controller of claim 16 wherein said wall, said flexible element and said stem are formed together as a single integral piece of an injection molded plastic.

22. The controller of claim 21 wherein said flexible element has a thickness smaller than a cross-sectional dimension of said stem to allow said flexible element to flex substantially greater than flex in said stem in response to movement of said moveable end of said stem.

23. The controller of claim 16 further comprising:

a wall connected to a periphery of said flexible element to form a cup, said first signal source, said first signal sensor and said flexible element being enclosed within said cup and a housing of said controller.

24. The controller of claim 23 wherein:

said wall, said flexible element and said stem are formed together as a single integral piece of an injection molded plastic.

25. A controller comprising:

a substrate;

a first signal source mounted on said substrate, said first signal source being capable of emitting an electromagnetic signal;

a plurality of signal sensors including a first signal sensor, said plurality of signal sensors being mounted on said substrate around said first signal source, said first signal sensor being capable of converting a portion of said electromagnetic signal incident on said first signal sensor into an electrical signal;

wherein said flexible element in said first shape transfers a first portion of said electromagnetic signal from said first signal source to said first signal sensor;

wherein on application of a force to said flexible element, said flexible element deforms elastically into a second shape and transfers a second portion of said electromagnetic signal to said first signal sensor; and further wherein on cessation of application of said force, said flexible element reverts to said first shape and transfers said first portion of said electromagnetic signal to said first signal sensor.

26. The controller of claim 25 wherein said signal sensors are photodiodes and said first signal source is a light emitting diode.

27. A controller comprising:

a first signal source capable of emitting an electromagnetic signal;

a plurality of signal sensors including a first signal sensor, said plurality of signal sensors being mounted around said first signal source, said first signal sensor being capable of converting a portion of said electromagnetic signal incident on said first signal sensor into an electrical signal;

wherein said flexible element in said first shape is substantially flat and transfers approximately equal portions of said electromagnetic signal to each of said plurality of signal sensors;

wherein said flexible element in said first shape transfers a first portion of said electromagnetic signal from said first signal source to said first signal sensor; and wherein on application of a force to said flexible element, said flexible element deforms elastically into a second shape and transfers a second portion of said electromagnetic signal to said first signal sensor.

28. The controller of claim 27 further comprising:

a wall connected to a periphery of said flexible element to form a cup, said first signal source, said first signal sensor and said flexible element being enclosed within said cup and a housing of said controller.

29. The controller of claim 27 further comprising:

a stem connected to a central region of said flexible element, said stem applying said force to said flexible element.

30. The controller of claim 29 wherein:

said wall, said flexible element and said stem are formed together as a single integral piece of an injection molded plastic; and on cessation of application of said force, said flexible element reverts to said first shape and transfers said first portion of said electromagnetic signal to said first signal sensor.

31. The controller of claim 29 wherein:

said stem has a movable end located away from said flexible element, and said stem pivots about a pivot point located in a central portion of said flexible element and deforms said flexible element in response to movement of said movable end.

32. The controller of claim 27 wherein:

said second portion of said electromagnetic signal incident on said first signal sensor has a magnitude dependent on an angle θ between two positions of a line tangential to said flexible element in said first shape and in said second shape; and on cessation of application of said force, said flexible element reverts to said first shape and transfers said first portion of said electromagnetic signal to said first signal sensor.

33. The controller of claim 32 further comprising:

a circuit coupled to said first signal sensor and said second signal sensor, said circuit generating a signal indicative of said angle θ.

34. The controller of claim 32 further comprising:

a line coupled to a common junction between said first signal sensor and a second signal sensor in said plurality of signal sensors, said line carrying a signal indicative of said angle θ.

35. A controller comprising:

a substrate;

a first signal source mounted on said substrate, said first signal source being capable of emitting an electromagnetic signal;

a first signal sensor mounted on said substrate, said first signal sensor being capable of converting a portion of said electromagnetic signal incident on said first signal sensor into an electrical signal;

a flexible element located adjacent said substrate facing said first signal source and said first signal sensor, said flexible element being opaque and having a first shape;

wherein said flexible element in said first shape transfers a first portion of said electromagnetic signal from said first signal source to said first signal sensor;

wherein on application of a force to said flexible element, said flexible element deforms elastically into a second shape and transfers a second portion of said electromagnetic signal to said first signal sensor; and wherein said substrate has a first side and a second side opposite said first side, said first signal source and said first signal sensor being mounted on said first side, said controller further comprising an electrical switch mounted on said second side in an area covered by said flexible element, said electrical switch being closed on physical contact between a housing of said controller and said substrate on application of a portion of said force to said flexible element.

36. The controller of claim 35 further comprising a spring located between said printed circuit board and said housing such that deflection of said spring on application of said second force closes said electrical switch.

37. A controller comprising:

a printed circuit board;

a plurality of optical elements mounted on the printed circuit board, at least one of said optical elements being a light emitting diode, and another of said optical elements being a photosensitive element;

a flexible element located adjacent said printed circuit board and facing said plurality of optical elements, said flexible element being opaque and having a substantially flat shaped cross-section;

wherein said flexible element transfers a first portion of light from said light emitting diode to said photodiode;

wherein on application of a force to said flexible element, said flexible element deforms elastically into a "S" shaped cross-section and transfers a second portion of said light to said photodiode; and further wherein on cessation of application of said force, said flexible element reverts to said flat shaped cross-section and transfers said first portion of said light to said photodiode;

wherein said plurality of optical elements comprises a plurality of light emitting diodes arranged symmetrically around said photosensitive element.

38. A controller comprising:

a printed circuit board;

a plurality of optical elements mounted on the printed circuit board, at least one of said optical elements being a light emitting diode, and another of said optical elements being a photosensitive element;

a flexible element located adjacent said printed circuit board and facing said plurality of optical elements, said flexible element being opaque and having a substantially flat shaped cross-section;

wherein said flexible element transfers a first portion of light from said light emitting diode to said photodiode;

wherein on application of a force to said flexible element, said flexible element deforms elastically into a "S" shaped cross-section and transfers a second portion of said light to said photodiode; and further wherein on cessation of application of said force, said flexible element reverts to said flat shaped cross-section and transfer first portion of said light to said photodiode;

wherein said plurality of optical elements comprises a plurality of phototransistors arranged symmetrically around said light emitting diode.

39. A controller comprising:

a printed circuit board;

a plurality of optical elements mounted on the printed circuit board, at least one of said optical elements being a light emitting diode, and another of said optical elements being a photosensitive element;

a flexible element located adjacent said printed circuit board and facing said plurality of optical elements, said flexible element being opaque and having a substantially flat shaped cross-section;

wherein said flexible element transfers a first portion of light from said light emitting diode to said photodiode;

wherein on application of a force to said flexible element, said flexible element deforms elastically into a "S" shaped cross-section and transfers a second portion of said light to said photodiode; and further wherein on cessation of application of said force, said flexible element reverts to said flat shaped cross-section and transfers said first portion of said light to said photodiode;

wherein said plurality of optical elements comprises a plurality of photodiodes arranged symmetrically around said light emitting diode.

40. A controller comprising:

a plurality of optical elements, at least one of said optical elements being a light emitting diode, and another of said optical elements being a photosensitive element;

a flexible element located facing said plurality of optical elements, said flexible element being opaque;

wherein said flexible element transfers a first portion of light from said light emitting diode to said photodiode;

wherein said plurality of photodiodes comprises a first photodiode having an anode and a cathode, and a second photodiode having an anode and a cathode, a cathode of said second photodiode is connected to said anode of said first photodiode; and said light emitting diode has an anode and a cathode, said anode of said light emitting diode being connected to said cathode of said first photodiode, and said cathode of said light emitting diode being connected to said anode of said second photodiode.

41. The controller of claim 40 further comprising:

a wall connected to a periphery of said flexible element to form a cup, said first signal source, said first signal sensor and said flexible element being enclosed within said cup and a housing of said controller.

42. The controller of claim 40 further comprising:

a stem connected to a central region of said flexible element, said stem applying said force to said flexible element.

43. The controller of claim 42 wherein:

said flexible element and said stem are formed together as a single integral piece of an injection molded plastic; and on cessation of application of said force, said flexible element reverts to said first shape and transfers said first portion of said electromagnetic signal to said first signal sensor.

* * * * *